US012812100B2

(12) United States Patent
Lee et al.

(10) Patent No.: US 12,812,100 B2
(45) **Date of Patent: *Nov. 24, 2026**

(54) IMAGE PROCESSING METHOD, AND IMAGE ENCODING/DECODING METHOD AND DEVICE WHICH USE SAME

(71) Applicants: ELECTRONICS AND TELECOMMUNICATIONS RESEARCH INSTITUTE, Daejeon (KR); CHIPS & MEDIA, INC, Seoul (KR); INDUSTRY ACADEMY COOPERATION FOUNDATION OF SEJONG UNIVERSITY, Seoul (KR)

(72) Inventors: Jin Ho Lee, Daejeon (KR); Jung Won Kang, Daejeon (KR); Ha Hyun Lee, Seoul (KR); Sung Chang Lim, Daejeon (KR); Hui Yong Kim, Daejeon (KR); Dae Yeon Kim, Seoul (KR); Yung Lyul Lee, Seoul (KR)

(73) Assignees: ELECTRONICS AND TELECOMMUNICATIONS RESEARCH INSTITUTE, Daejeon (KR); CHIPS & MEDIA, INC, Seoul (KR); INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/068,095

(22) Filed: Mar. 3, 2025

(65) Prior Publication Data

US 2025/0203068 A1 Jun. 19, 2025

Related U.S. Application Data

(63) Continuation of application No. 18/482,863, filed on Oct. 7, 2023, now Pat. No. 12,284,338, which is a (Continued)

(30) Foreign Application Priority Data

Jul. 28, 2017 (KR) ........................ 10-2017-0096443
Jul. 28, 2017 (KR) ........................ 10-2017-0096444

(51) Int. Cl.
*H04N 19/11* (2014.01)
*H04N 19/176* (2014.01)

(Continued)

(52) U.S. Cl.
CPC ........... *H04N 19/11* (2014.11); *H04N 19/176* (2014.11); *H04N 19/18* (2014.11); *H04N 19/46* (2014.11); *H04N 19/593* (2014.11)

(58) Field of Classification Search
CPC ..................................................... H04N 19/11
See application file for complete search history.

(56) References Cited

U.S. PATENT DOCUMENTS

2012/0307894 A1 12/2012 Chien et al.
2013/0136175 A1 5/2013 Wang et al.

(Continued)

FOREIGN PATENT DOCUMENTS

CN 103563389 A 2/2014
CN 103636215 A 3/2014

(Continued)

OTHER PUBLICATIONS

Seregin, Vadim, et al., "Variable Number of Intra Modes", Qualcomm Incorporated, JVET-D0113r2, Oct. 15-21, 2016, (2 Pages in English).

(Continued)

*Primary Examiner* — Jerry T Jean Baptiste
(74) *Attorney, Agent, or Firm* — NSIP Law

(57) ABSTRACT

The present invention relates to an image encoding/decoding method and apparatus. The image decoding method accord- (Continued)

ing to the present invention may comprise acquiring transform coefficients distribution information of a neighboring block from a bitstream; direction-adaptively determining an intra prediction mode of a current block to be decoded, according to the transform coefficients distribution information of the neighboring block; and reconstructing the current block, based on the determined intra prediction mode, wherein the direction-adaptively determining includes determining similarity flag information corresponding to the neighboring block, based on the transform coefficients distribution information of the neighboring block.

3 Claims, 28 Drawing Sheets

Related U.S. Application Data continuation of application No. 17/885,349, filed on Aug. 10, 2022, now Pat. No. 11,838,502, which is a continuation of application No. 17/314,192, filed on May 7, 2021, now Pat. No. 11,463,690, which is a continuation of application No. 16/633,340, filed as application No. PCT/KR2018/008559 on Jul. 27, 2018, now Pat. No. 11,044,471.

(51) Int. Cl.

*H04N 19/18* (2014.01)
*H04N 19/46* (2014.01)
*H04N 19/593* (2014.01)

(56) References Cited

U.S. PATENT DOCUMENTS

| | | | |
|---|---|---|---|
| 2014/0140404 A1 | 5/2014 | Liu et al. | |
| 2014/0192862 A1 | 7/2014 | Flynn et al. | |
| 2015/0208066 A1 | 7/2015 | Seregin et al. | |
| 2015/0229955 A1 | 8/2015 | Seregin et al. | |
| 2016/0057421 A1 | 2/2016 | Oh et al. | |
| 2016/0198185 A1 | 7/2016 | Oh et al. | |
| 2017/0332084 A1 | 11/2017 | Seregin et al. | |
| 2018/0255299 A1 | 9/2018 | Lee et al. | |
| 2018/0343455 A1* | 11/2018 | Jang | H04N 19/105 |
| 2019/0028729 A1 | 1/2019 | Boon et al. | |
| 2019/0174128 A1* | 6/2019 | Jang | H04N 19/11 |
| 2025/0071343 A1 | 2/2025 | Kim et al. | |
| 2025/0106388 A1 | 3/2025 | Ko et al. | |

FOREIGN PATENT DOCUMENTS

| | | |
|---|---|---|
| CN | 103748877 A | 4/2014 |
| CN | 103765892 A | 4/2014 |
| CN | 104160704 A | 11/2014 |
| CN | 105338345 A | 2/2016 |
| CN | 106231312 A | 12/2016 |
| KR | 10-0772576 B1 | 11/2007 |
| KR | 10-2013-0067038 A | 6/2013 |
| KR | 10-2013-0105114 A | 9/2013 |
| KR | 10-2014-0049098 A | 4/2014 |
| KR | 10-1433170 B1 | 8/2014 |
| KR | 10-2017-0034354 A | 3/2017 |
| KR | 10-2017-0034800 A | 3/2017 |
| KR | 10-2017-0069917 A | 6/2017 |
| KR | 10-1743665 B1 | 6/2017 |
| WO | WO 2012/096095 A1 | 7/2012 |
| WO | WO 2012/096229 A1 | 7/2012 |
| WO | WO 2013/006297 A1 | 1/2013 |
| WO | WO 2013/106705 A2 | 7/2013 |
| WO | WO 2013/111977 A1 | 8/2013 |
| WO | WO 2017/039256 A1 | 3/2017 |
| WO | WO 2017/082670 A1 | 5/2017 |

OTHER PUBLICATIONS

Zhao, Liang, et al., "CE3-related: Wide Angular Intra Prediction for Non-Square Blocks", Tencent, JVET-K0289, Version 4, Jul. 18, 2018, (5 Pages in English).

International Search Report issued on Nov. 1, 2018 in corresponding International Patent Application No. PCT/KR2018/008559 (2 pages in English, 2 pages in Korean).

Rath, Gagan et al., "CE3-related: Block Shape Adaptive Intra Prediction Directions," Joint Video Exploration Team (JVET) of ITU-T SG 16 WP 3 and ISO/IEC JTC 1/SC 29/WG 11, JVET-K0169, 2018, (pp. 1-6).

Chinese Office Action Issued on Jan. 31, 2023, in counterpart Chinese Patent Application No. 201880050380.6 (4 Pages in English, 7 Pages in Chinese).

Chinese Office Action issue on May 1, 2026, in counterpart Chinese Patent Application.

Seregin, Vadim, et al., "Block Shape Dependent Intra Mode Coding", Qualcomm Incorporated, Joint Video Exploration Team (JVET) of ITU-T SG 16 WP 3 and ISO/IEC JTC 1/SC 29/WG 11, 7th Meeting: Torino, IT, Jul. 13-21, 2017, JVET-G0159, (3 Pages in English).

* cited by examiner (a)

FIG. 34

| Mode | Bin String | Note |
|---|---|---|
| MPM_0 | 100 | DC |
| MPM_1 | 101 | 4 (HOR) |
| MPM_2 | 110 | PLANAR |
| 5 | 111 | SET0 |
| 6 | 0100 | SET0 |
| 7 | 0101 | SET0 |
| 8 | 0110 | SET0 |
| 0 | 0111 | SET0 |
| 1 | 00100 | SET0 |
| 2 | 00101 | SET0 |
| 3 | 00110 | SET0 |
| 12 | 00111 | SET0 |
| 13 | 0001000 | SET1 |
| 14 | 0001001 | SET1 |
| 15 | 0001010 | SET1 |
| 16 | 0001011 | SET1 |
| ... | ... | ... |

IMAGE PROCESSING METHOD, AND IMAGE ENCODING/DECODING METHOD AND DEVICE WHICH USE SAME

CROSS REFERENCE TO RELATED APPLICATIONS

This application is a Continuation Application of U.S. patent application Ser. No. 18/482,863 filed on Oct. 7, 2023, which is a Continuation Application of U.S. patent application Ser. No. 17/885,349, filed on Aug. 10, 2022, now U.S. Pat. No. 11,838,502 issued on Dec. 5, 2023, which is a Continuation Application of U.S. patent application Ser. No. 17/314,192, filed on May 7, 2021, now U.S. Pat. No. 11,463,690, issued on Oct. 4, 2022, which is a Continuation Application of U.S. patent application Ser. No. 16/633,340, filed on Jan. 23, 2020, now U.S. Pat. No. 11,044,471, issued on Jun. 22, 2021, which is a U.S. National Stage Application of International Application No. PCT/KR2018/008559, filed on Jul. 27, 2018, which claims the benefit under 35 USC 119(a) and 365(b) of Korean Patent Application No. 10-2017-0096443, filed on Jul. 28, 2017 and Korean Patent Application No. 10-2017-0096444, filed on Jul. 28, 2017 in the Korean Intellectual Property Office, the entire disclosures of which are incorporated herein by reference for all purposes.

TECHNICAL FIELD

The present invention relates to an image encoding/decoding method, an image encoding/decoding apparatus, and a recording medium in which a bitstream is stored. More particularly, the present invention relates to an image encoding/decoding method and apparatus using intra prediction and a recording medium in which a bitstream generated by the image encoding/decoding method and apparatus is stored.

BACKGROUND ART

Digital video technologies may collectively find their applications in a wide range of digital video devices such as digital televisions, digital direct broadcast systems, wireless broadcast systems, personal digital assistants (PDAs), laptop or desktop computers, digital cameras, digital recording devices, video gaming devices, and video game consoles. A digital video device efficiently transmits and receives digital video information by using video compression techniques such as MPEG-2, MPEG-4, ITU-T H.264/MPEG-4, Part 10, Advanced Video Coding (AVC), and H.265/HEVC (High Efficiency Video Coding). A video compression technique involves spatial prediction and temporal prediction to remove or reduce the inherent redundancy existing in a video sequence.

There are various image compression techniques such as inter prediction for predicting values of pixels within a current picture from a previous picture or a subsequent picture of the current picture, intra prediction for predicting values of pixels within a region of a current picture from another region of the current picture, and entropy encoding for allocating shorter codes for frequently occurring pixel values and longer codes for less-occurring pixel values. With these image compression techniques, video data can be effectively compressed, transmitted, and stored.

In order to cost-effectively cope with various resolutions, various frame rates, etc. of images required in such applications, a video decoding apparatus that can easily process images according to performances and functions required in the applications is required.

For example, when compressing an image, a picture is first divided into a plurality of blocks each having a predetermined size, and then coding is performed on a per block basis. To increase compression efficiency, inter prediction and intra prediction techniques are used to eliminate redundancy in pictures.

In this case, a residual signal may be generated through intra prediction or inter prediction. When encoding is performed on the residual signal, the amount of data is reduced and thus the data compression rate is increased. As prediction is performed with higher efficiency, a residual signal with a smaller value can be obtained. Therefore, more effective prediction can be performed using the residual signal.

The intra prediction technique predicts data of a current block, using pixels located around the current block. The difference between the actual value and the predicted value for each pixel in the current block is called a residual signal block. For intra prediction, HEVC supports an increased number of prediction modes (35 modes) compared to existing H.264/AVC which supports 9 prediction modes.

For inter prediction, a current block is compared with blocks in neighboring pictures to find the most similar block to the current block. Position information (Vx, Vy) of the located block is referred to as a motion vector. A difference between each pixel in the current block and each pixel in a predicted block created based on the motion vector are called a residual signal or a motion-compensated residual block.

In this way, the precision of the intra prediction and the inter prediction is increased. As a result, while the amount of data of the residual signal decreases, the amount of computation for processing a moving image greatly increases.

In particular, for more efficient image compression, 67 intra prediction modes can be used in current technology. These include planar mode, DC mode, and 65 intra directional modes and can more accurately and precisely process directions of edges in a natural image.

Due to such finely divided intra prediction modes, the number of bits required to encode information on the optimal intra prediction mode is greatly increased, which results in a problem of lowering the compression efficiency.

To solve this problem, i.e., to reduce the amount of information, the optimum intra mode of the current block may be derived from information on other blocks that have been previously decoded.

However, although the technique of deriving an intra mode for predicting a current block can somewhat reduce a compression rate, the technique has a problem of greatly increasing the computational complexity for encoding and decoding.

In particular, there is a problem that during derivation of an intra mode of a current block, decoded values or intra modes of other blocks need to be parsed first. Furthermore, when it is necessary to refer to other blocks to encode or decode a current block, a decoding apparatus has parsing dependency between a decoding process of a previous block and a current block. This not only increases computational complexity but also causes difficulties in implementing modules of the apparatus and in configuring data.

DISCLOSURE

Technical Problem

The present invention is intended to provide an image encoding/decoding method and apparatus capable of improving image quality and compression efficiency.

In addition, the present invention is intended to provide an image encoding/decoding method and apparatus performing image encoding/decoding through intra prediction, the method and apparatus being capable of improving compression efficiency.

In addition, the present invention is intended to provide a recording medium in which a bitstream generated by the image encoding/decoding method or apparatus is stored.

Technical Solution

A method of decoding an image according to the present invention, the method may comprise acquiring transform coefficients distribution information of a neighboring block from a bitstream; direction-adaptively determining an intra prediction mode of a current block to be decoded, according to the transform coefficients distribution information of the neighboring block; reconstructing the current block, based on the determined intra prediction mode, wherein the direction-adaptively determining includes determining similarity flag information corresponding to the neighboring block, based on the transform coefficients distribution information of the neighboring block.

In the method of decoding an image according to the present invention, wherein when the neighboring block is located to the left of the current block, the similarity flag information includes horizontal similarity flag information.

In the method of decoding an image according to the present invention, wherein when the neighboring block is located to the top of the current block, the similarity flag information includes vertical similarity flag information.

In the method of decoding an image according to the present invention, wherein the direction-adaptively determining includes finely segmenting intra prediction modes in a specific direction to increase the number of candidate modes in the specific direction, for the intra prediction mode of the current block, according to the similarity flag information.

In the method of decoding an image according to the present invention, wherein the finely segmenting the intra prediction modes in the specific direction includes segmenting intra prediction modes usable in the current block in a predetermined horizontal directional range or a predetermined vertical directional range according to the similarity flag information.

In the method of decoding an image according to the present invention, wherein the finely segmenting the intra prediction modes in the specific direction comprises: finely segmenting modes corresponding to a horizontal similarity flag or a vertical similarity flag within a most probable mode (MPM) candidates list for the current block according to the similarity flag information; and adding the modes resulting from the segmentation to the MPM candidates list.

In the method of decoding an image according to the present invention, further comprising acquiring intra prediction mode information of the neighboring block, wherein the direction-adaptively determining includes determining horizontal similarity flag information or vertical similarity flag information of the neighboring block, based on the intra prediction mode information and the transform coefficients distribution information of the neighboring block.

In the method of decoding an image according to the present invention, wherein the finely segmenting the intra prediction modes in the specific direction includes restricting the intra prediction modes usable in the current block to a horizontal direction or a vertical direction according to the similarity flag information.

An apparatus of decoding an image according to the present invention, the apparatus may comprise a neighboring block information processing unit configured to acquire transform coefficients distribution information of a neighboring block from a bitstream; a mode determination unit configured to direction-adaptively determine an intra prediction mode of a current block to be decoded, according to the transform coefficients distribution information of the neighboring block; and an intra prediction unit configured to reconstruct the current block, based on the determined intra prediction mode, wherein the mode determination unit determines similarity flag information corresponding to the neighboring block, based on the transform coefficients distribution information of the neighboring block.

In the apparatus of decoding an image according to the present invention, wherein when the neighboring block is located to the left of the current block, the similarity flag information includes horizontal similarity flag information.

In the apparatus of decoding an image according to the present invention, wherein when the neighboring block is located to the top of the current block, the similarity flag information includes vertical similarity flag information.

In the apparatus of decoding an image according to the present invention, wherein the mode determination unit finely segments candidate modes for the intra prediction mode of the current block, according to the similarity flag information.

In the apparatus of decoding an image according to the present invention, wherein the mode determination unit finely segments intra prediction modes usable in the current block within a predetermined range in a horizontal direction or a vertical direction according to the similarity flag information.

In the apparatus of decoding an image according to the present invention, wherein the mode determination unit finely segments modes corresponding to a horizontal similarity flag or a vertical similarity flag within a most probable mode (MPM) candidates list of the current block, according to the similarity flag information.

In the apparatus of decoding an image according to the present invention, further comprising a neighboring mode identification unit configured to obtain the intra prediction mode information of the neighboring block, wherein the mode determination unit determines horizontal similarity flag information or vertical similarity flag information of the neighboring block, based on the intra prediction mode information and the transform coefficients distribution information of the neighboring block.

In the apparatus of decoding an image according to the present invention, the mode determination unit restricts the intra prediction modes usable in the current block to a horizontal direction or a vertical direction, according to the similarity flag information.

A method of encoding an image according to the present invention, acquiring information on a neighboring block of a current block to be encoded; direction-adaptively determining an intra prediction mode of the current block to be encoded, according to the information on the neighboring block; and encoding the current block according to the determined intra prediction mode.

In the method of encoding an image according to the present invention, wherein the direction-adaptively determining includes determining similarity flag information corresponding to the neighboring block, based on the transform coefficients distribution information of the neighboring block.

In the method of encoding an image according to the present invention, wherein determining a lookup table used for entropy encoding, according to directionality information of the current block which is determined based on the information on the neighboring block.

A computer-readable recording medium according to the present invention may store a bitstream generated by an image encoding method according to the present invention.

It is to be understood that the foregoing summarized features are exemplary aspects of the following detailed description of the present invention without limiting the scope of the present invention.

Advantageous Effects

According to the present invention, it is possible to provide an image encoding/decoding method and apparatus capable of improving image quality and compression efficiency.

In addition, according to the present invention, it is possible to provide an image encoding/decoding method and apparatus performing image encoding/decoding through intra prediction, the method and apparatus being capable of improving compression efficiency.

In addition, according to the present invention, it is possible to provide a recording medium in which a bitstream generated by the image encoding/decoding method or apparatus is stored.

DESCRIPTION OF DRAWINGS

FIGS. 32 through 34 are views illustrating a method of improving entropy coding efficiency using information on neighboring blocks according to one embodiment of the present disclosure.

BEST MODE

Mode for Invention

Figure 1:
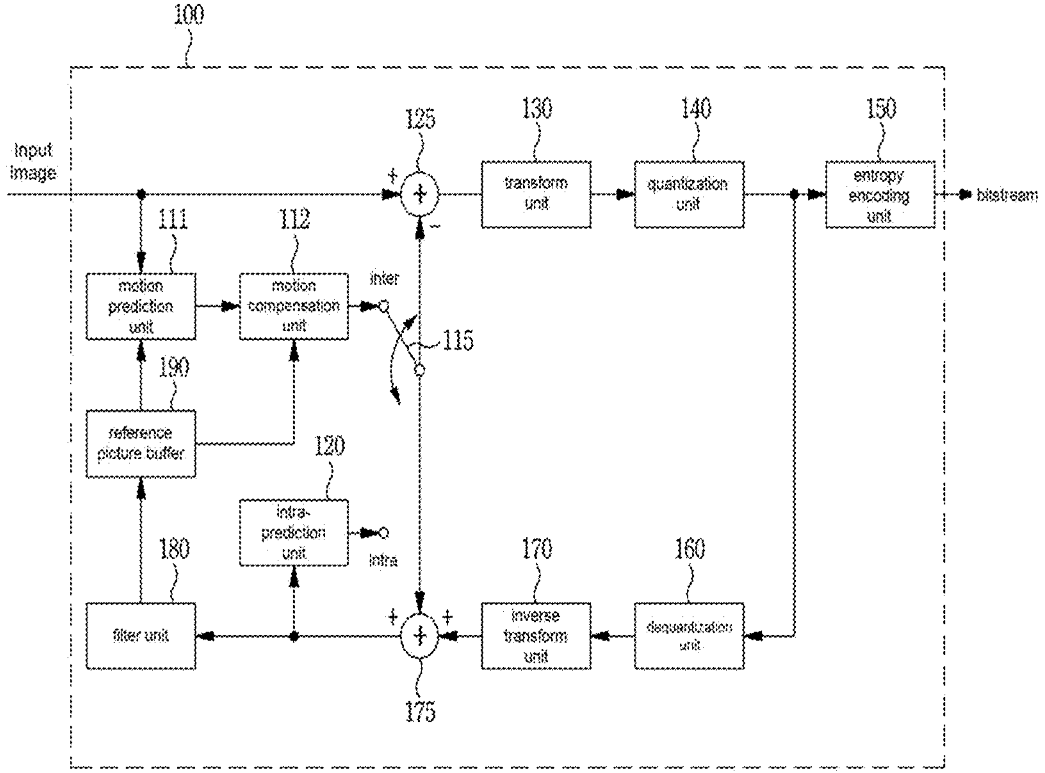
FIG. 1 is a block diagram illustrating the configuration of an encoding apparatus to which one embodiment of the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, ‘first’, ‘second’, etc. can be used to describe various components, but the components are not to be construed as being limited to the terms. The terms are only used to differentiate one component from other components. For example, the ‘first’ component may be named the ‘second’ component without departing from the scope of the present invention, and the ‘second’ component may also be similarly named the ‘first’ component. The term ‘and/or’ includes a combination of a plurality of items or any one of a plurality of terms.

It will be understood that when an element is simply referred to as being ‘connected to’ or ‘coupled to’ another element without being ‘directly connected to’ or ‘directly coupled to’ another element in the present description, it may be ‘directly connected to’ or ‘directly coupled to’ another element or be connected to or coupled to another element, having the other element intervening therebetween. In contrast, it should be understood that when an element is referred to as being “directly coupled” or “directly connected” to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as “including”, “having”, etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being “included”, elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, “encoding or decoding or both of an image” may mean “encoding or decoding or both of a moving picture”, and may mean “encoding or decoding or both of one image among images of a moving picture.”

Hereinafter, terms “moving picture” and “video” may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms “image”, “picture, “frame” and “screen” may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms “target block” and “current block” may be used as the same meaning and be replaced with each other.

Hereinafter, terms “block” and “unit” may be used as the same meaning and be replaced with each other. Or a “block” may represent a specific unit.

Hereinafter, terms “region” and “segment” may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to “0” may represent a logical false or the first predefined value. In other words, a value “0”, a false, a logical false and the first predefined value may be replaced with each other. A value of information, data, flag, index, element and attribute equal to “1” may represent a logical true or the second predefined value. In other words, a value “1”, a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and temary-tree partitioning method to configure a lower unit such as coding unit, prediction unit, transform unit, etc. It may be used as a term for designating a sample block that becomes a process unit when encoding/decoding an image as an input image. Here, the quad-tree may mean a quarterary-tree.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, and tile header information.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, a inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
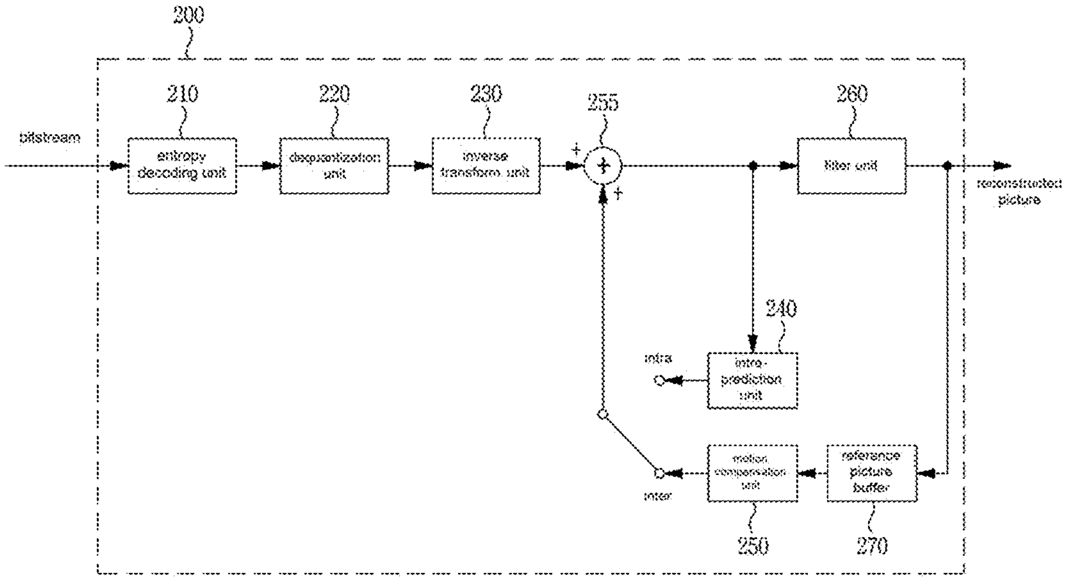
FIG. 2 is a block diagram illustrating the configuration of a decoding apparatus to which one embodiment of the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, a inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
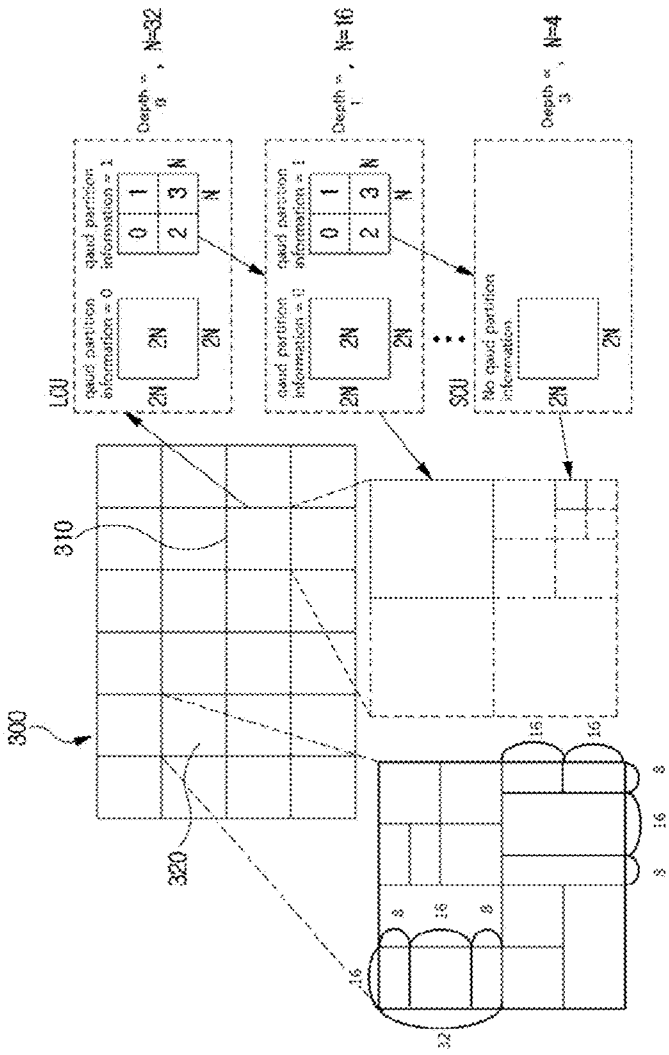
FIG. 3 is a schematic view illustrating a partitioned structure of an image used for image encoding/decoding.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is 1, the CU may not be partitioned, when a value of partition information is 2, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a temary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a temary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the temary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction information, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and temary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a temary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a temary tree) may vary depending on the type of slice. For example, for an intra-picture slice, the maximum size of a ternary tree may be 32×32. For example, for an inter-picture slice, the maximum size of a temary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction temary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
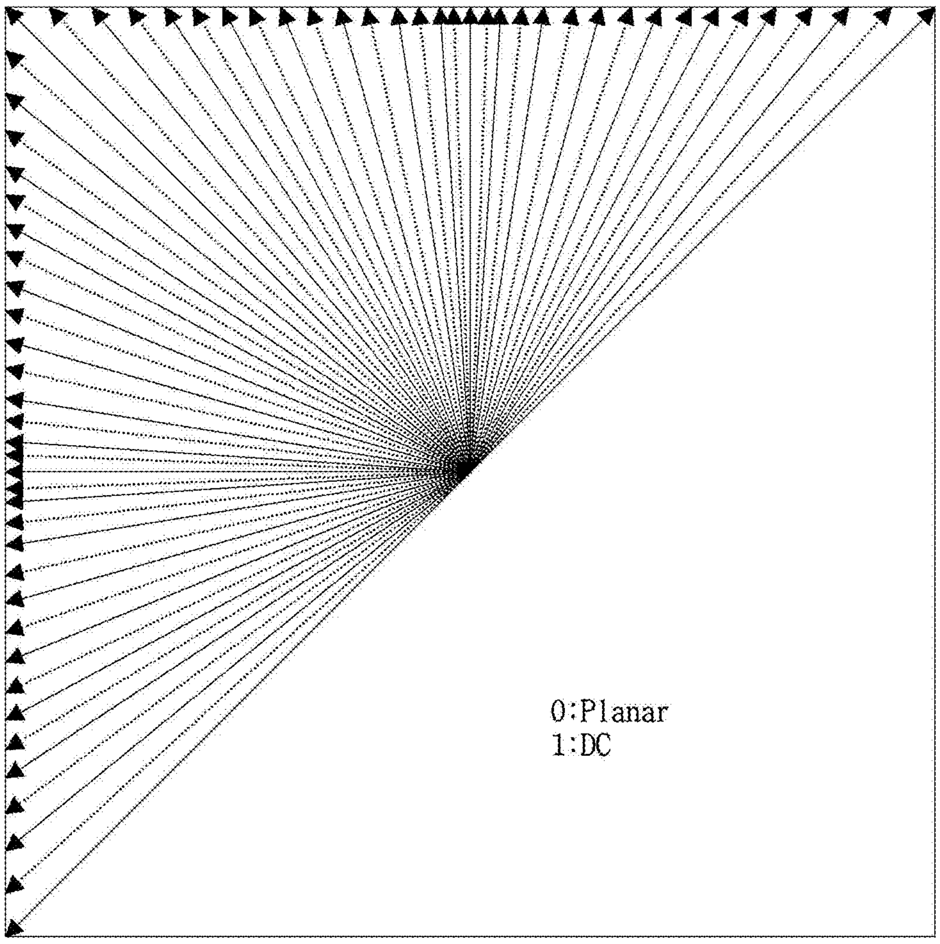
FIG. 4 is a diagram illustrating one embodiment of an intra prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than or equal to 1, including the non-angular and the angular mode.

In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
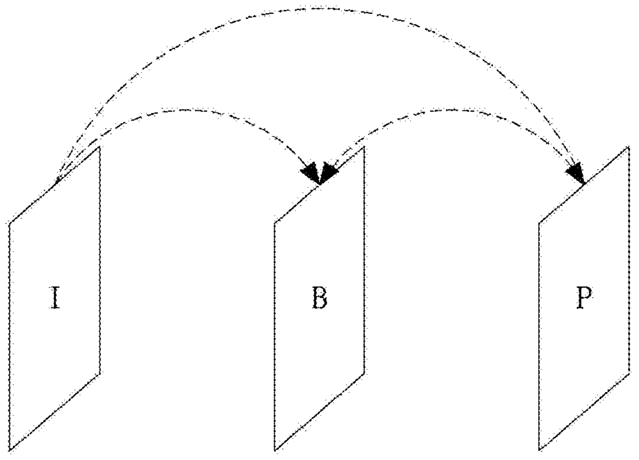
FIG. 5 is a diagram illustrating one embodiment of an inter prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are present in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

A method of deriving the motion information of the current block may vary depending on a prediction mode of the current block. For example, as prediction modes for inter-picture prediction, there may be an AMVP mode, a merge mode, a skip mode, a current picture reference mode, etc. The merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the motion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current block may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least either one of the zero merge candidate and new motion information that is a combination of the motion information (spatial merge candidate) of one neighboring block adjacent to the current block, the motion information (temporal merge candidate) of the collocated block of the current block, which is included within the reference picture, and the motion information exiting in the merge candidate list.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The current picture reference mode may mean a prediction mode in which a previously reconstructed region within a current picture to which the current block belongs is used for prediction. Here, a vector may be used to specify the previously-reconstructed region. Information indicating whether the current block is to be encoded in the current picture reference mode may be encoded by using the reference picture index of the current block. The flag or index indicating whether or not the current block is a block encoded in the current picture reference mode may be signaled, and may be deduced based on the reference picture index of the current block. In the case where the current block is encoded in the current picture reference mode, the current picture may be added to the reference picture list for the current block so as to be located at a fixed position or a random position in the reference picture list. The fixed position may be, for example, a position indicated by a reference picture index of 0, or the last position in the list. When the current picture is added to the reference picture list so as to be located at the random position, the reference picture index indicating the random position may be signaled.

Figure 6:
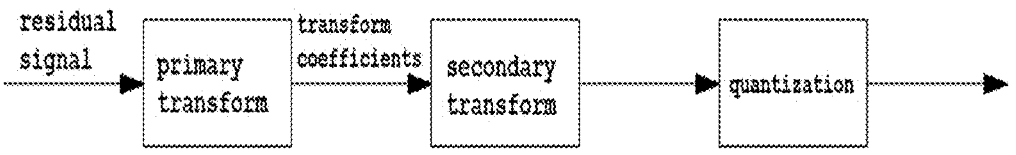
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, the transform scheme may be determined through signaling of transform information.

Since the residual signal is quantized through the primary transform and the secondary transform, a quantized-level signal (quantization coefficients) is generated. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Figure 7:
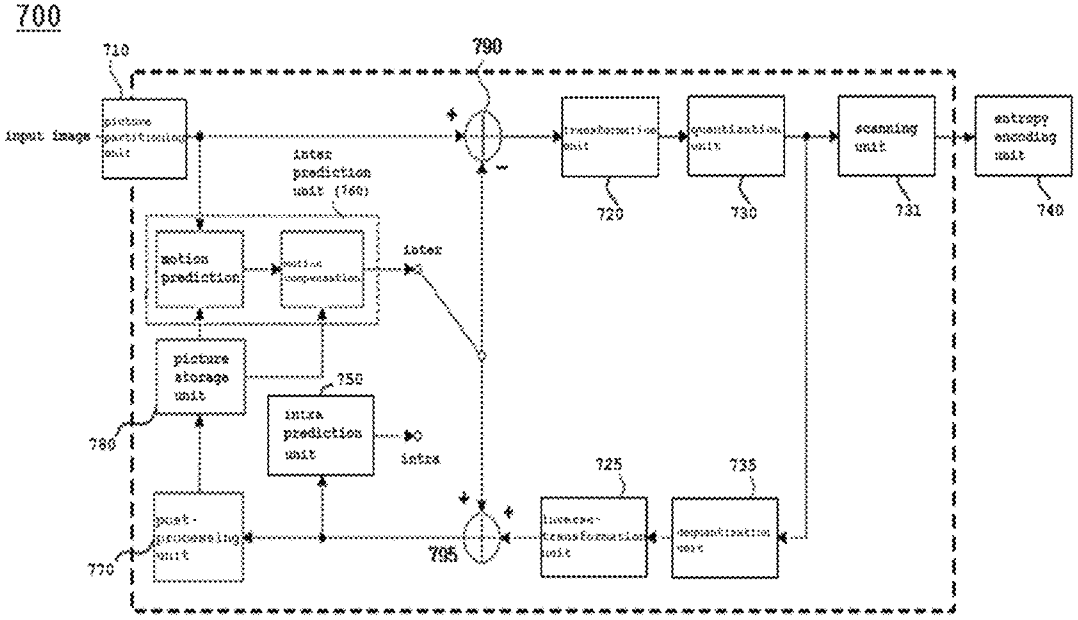
FIG. 7 is a block diagram illustrating the configuration of an image encoding apparatus according to one embodiment of the present disclosure.

FIG. 7 is a block diagram illustrating the configuration of an image encoding apparatus according to one embodiment of the present disclosure. FIG. 7 illustrates one embodiment of FIG. 1.

An image encoding apparatus 700 includes a picture partitioning unit 710, a transformation unit 720, a quantization unit 730, a scanning unit 731, an entropy encoding unit 740, an intra prediction unit 750, an inter prediction unit 760, a dequantization unit 735, an inverse-transformation unit 725, a post-processing unit 770, a picture storage unit 780, a subtractor 790, and an adder 795.

Referring to FIG. 7, the picture partitioning unit 710 analyzes an input video signal, partitions a picture into coding units, determines a prediction mode, and determines a size of a prediction unit for each coding unit.

The picture partitioning unit 710 feeds a prediction unit to be encoded into the intra prediction unit 750 or the inter prediction unit 760 according to a prediction mode (or a prediction method) selected. The picture partitioning unit 710 feeds the prediction unit to be encoded into the subtractor 790.

A picture of an image (i.e., video) includes a plurality of slices, and each slice can be partitioned into a plurality of coding tree units (CTUs) each of which is a basic unit for picture partitioning.

Each of the coding tree units can be partitioned into one, two, or more coding units (CUs) each of which is a basic unit for inter prediction or intra prediction.

The maximum size of the coding tree unit may differ from the maximum size of the coding unit, and information on these may be transmitted to a decoding apparatus 1300.

Each of the coding units can be partitioned into one or more prediction units (PU) each of which is a basic unit for a prediction process.

In this case, the encoding apparatus 700 selects one prediction method among intra prediction and inter prediction for each coding unit, and may differently generate prediction blocks for each prediction unit.

Each coding unit CU can be partitioned into one, two, or more transform units (TU) each of which is a basic unit for transform of a residual block.

In this case, the picture partitioning unit 710 feed image data into the subtractor 790 on a per block basis (for example, on a per prediction unit basis or a per transform unit basis).

FIGS. 8 through 11 are diagrams used to describe a method of partitioning an image into blocks and performing image processing on a per block basis, according to one embodiment of the present disclosure. FIGS. 8 through 11 illustrate one embodiment of FIG. 3.

Figure 8:
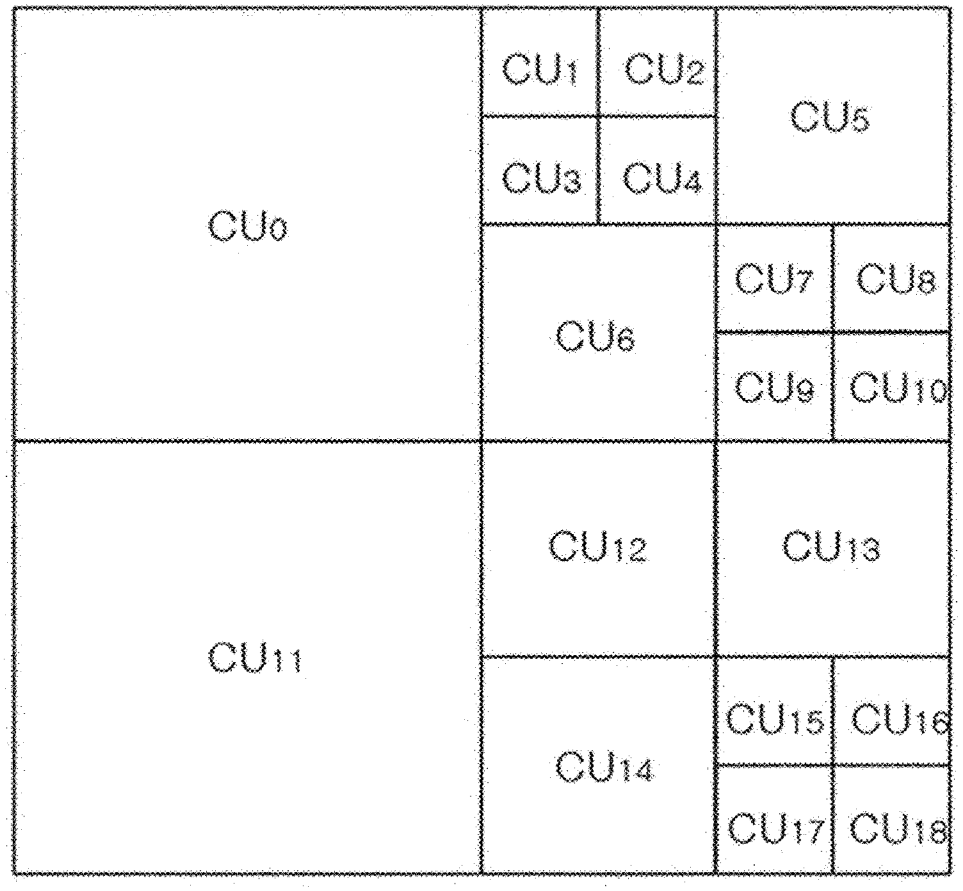
FIGS. 8 through 11 are diagrams illustrating a method of partitioning an image into blocks and performing image processing on a per block basis, according to one embodiment of the present disclosure.

Referring to FIG. 8, when a 256×256 coding tree unit (CTU) is partitioned into equally-sized four square coding units (CUs) using a quad tree structure.

Each of the four square coding units (CUs) may be further partitioned using a quad tree structure. Each of the coding units (CUs) partitioned through a quad tree structure may have a depth which is any one value in a range of from zero to three.

In addition, as described below, coding units that have been partitioned using a quad tree structure can be further partitioned using a binary tree structure. That is, one quad tree block can be divided into two binary tree sub-blocks. A CTU is first partitioned using a quad tree structure. One node can be partitioned down to a minimum quad tree node size minQTSize. When the size of a node in a quad tree structure is not larger than the maximum allowable binary tree node size MaxBTSize, the node in the quad tree structure can be further partitioned using a binary tree structure. In addition, a node in a binary tree structure can be partitioned down to a minimum allowable binary tree node size or a maximum allowable binary tree partition depth.

That is, a CTU is partitioned using a quad tree structure first, and each node generated through the partitioning can be further partitioned recursively using a quad tree structure or a binary tree structure. A binary tree node generated through final partitioning is not further partitioned and is determined as a coding unit that is a basic unit for prediction and transform. Here, when the CU is a block generated through binary tree partitioning, an asymmetric binary partitioning process may be performed. When the asymmetric binary partitioning is performed, one CU may be divided into two sub-CUs respectively having a ¼ size and a ¾ size of the original coding unit CU.

The coding unit CU may be partitioned into two or more prediction units, depending on a prediction mode to be used.

Figure 9:
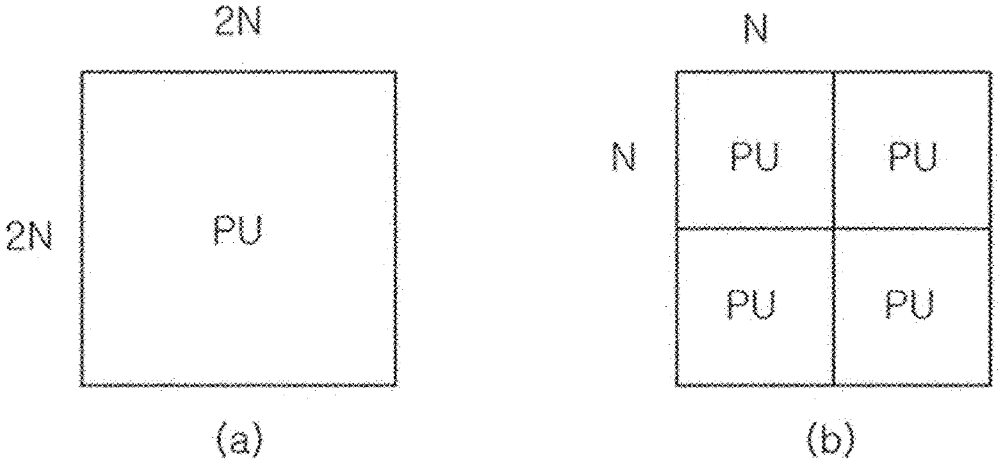

For an intra prediction mode, when one CU has a size of 2N×2N, one PU may have a size of 2N×2N as illustrated in (a) of FIG. 9 or a size of N×N as illustrated in (b) of FIG. 9.

Figure 10:
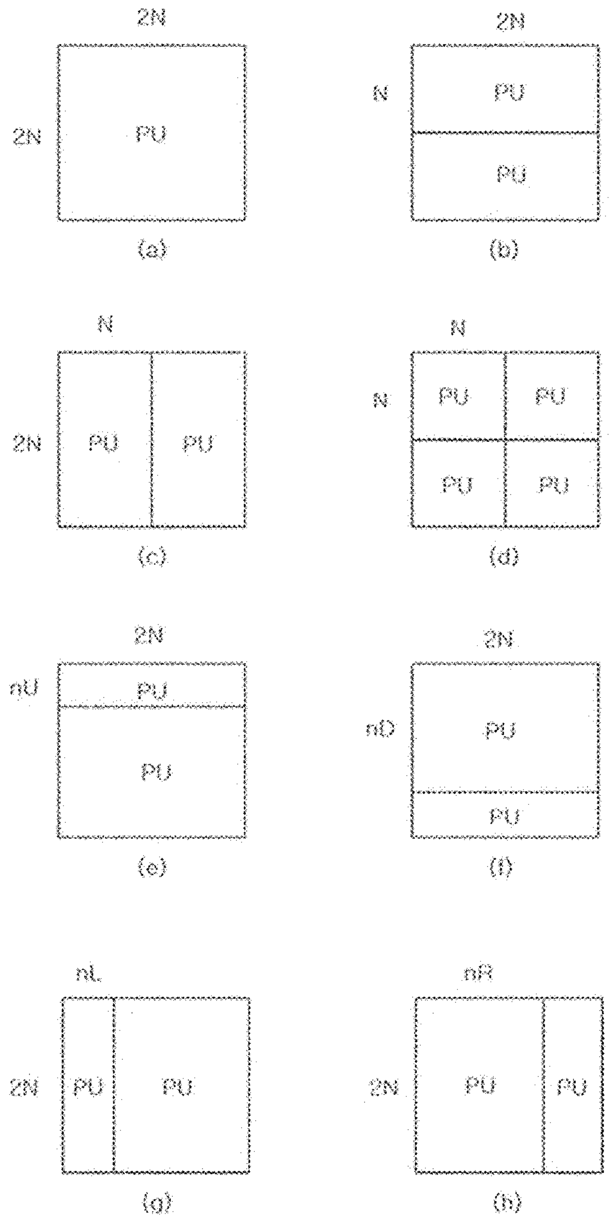

On the other hand, in an inter prediction mode, when one coding unit CU has a size of 2N×2N, one prediction unit PU may have any size among a size of 2N×2N illustrated in (a) of FIG. 10, a size of 2N×N illustrated in (b) of FIG. 10, a size of N×2N illustrated in (c) of FIG. 10, a size of N×N illustrated in (d) of FIG. 10, a size of 2N×nU illustrated in (e) of FIG. 10, a size of 2N×nD illustrated in (f) of FIG. 10, a size of nL×2N illustrated in (g) of FIG. 10, and a size of nRx2N illustrated in (h) of FIG. 10.

Figure 11:
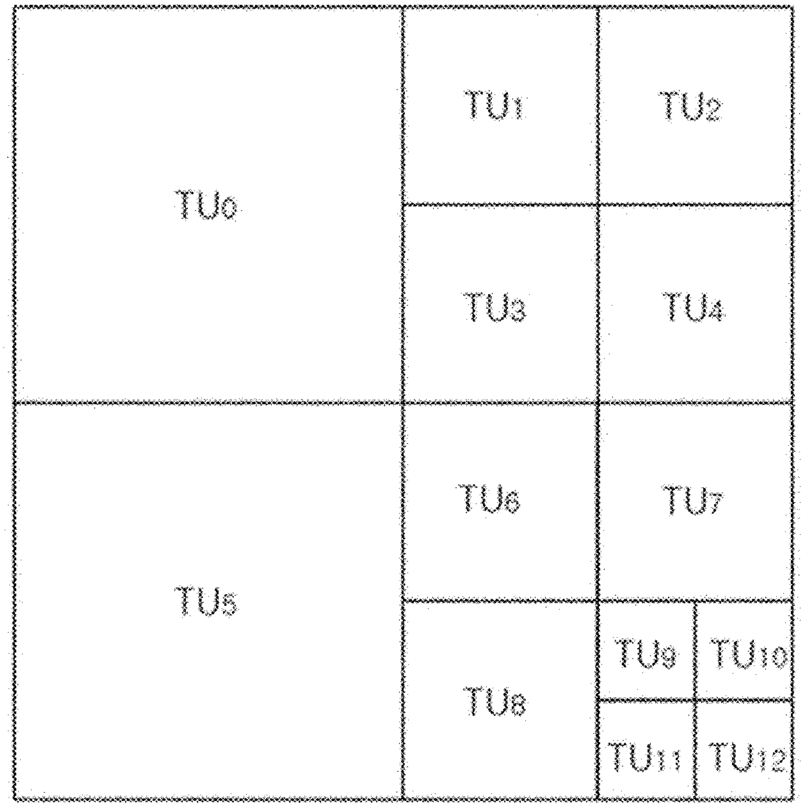

Referring to FIG. 11, a coding unit CU is partitioned using a quad tree structure to produce four square transform units (TUs).

Each of the four square transform units TUs may be further partitioned using a quad tree structure. Each of the four transform units may have a partition depth which is any one value in a range of from zero to three.

When the coding unit CU is to be predicted with an inter prediction mode, the prediction units PU and the transform units TU may independently have different partition structures.

When the coding unit CU is to be predicted with an intra prediction mode, the transform units TU resulting from partitioning of the coding unit CU will have a size not larger than that of the prediction units PU.

The transform unit TU may have a maximum size of 64×64 pixels.

The transformation unit 720 may transform a residual block that is a residual signal which is a difference between the original signal of the input prediction unit PU and the predicted signal of the input prediction unit generated by the intra prediction unit 750 or the inter prediction unit 760. The transform may be performed on a per TU basis.

A transform matrix used in the transform process may be determined depending on which mode is used, between intra mode or inter mode. Since the residual signal generated through intra prediction has a directionality according to an intra prediction mode, the transform matrix can be adaptively determined.

The transform unit may be transformed into two (horizontal and vertical) one-dimensional transform matrices. For example, a predetermined one transform matrix may be used for inter prediction.

On the other hand, in the case of an intra prediction mode, when a horizontal mode is selected as the intra prediction mode, since the residual block is likely to have a vertical directionality, a DCT-based integer matrix is used for a vertical direction and a KLT-based integer matrix is used for a horizontal direction. When the intra prediction mode is a vertical direction mode, both of the DST-based integer matrix and the KLT-based integer matrix are used for the vertical direction and the DCT-based integer matrix is used for the horizontal direction.

In DC mode, the DCT-based integer matrix is applied to both of the horizontal and vertical directions.

In the case of intra prediction, the transform matrix may be adaptively determined according to the size of the transform unit (TU).

On the other hand, the transformation unit 720 may select a transform kernel type in terms of coding efficiency. The transformation unit 720 may define various types of basis functions for inter prediction modes and intra prediction modes and selectively use one of the basis functions.

The transformation unit 720 may define various types of basis functions for inter prediction modes and intra prediction modes and selectively use one of the basis functions. The transformation unit 720 may be equipped with a mapping table for a supplemental transform, thereby being capable of performing supplemental transform. For example, the transformation unit 720 can perform a mode dependent non-separable secondary transform (MDNSST) process.

The quantization unit 730 determines a quantization step size for quantizing coefficients resulting from the transform of the residual block using the transform matrix, in which the quantization step size may be determined for each quantization unit having a predetermined size or larger.

The size of the quantization unit may be 8×8 or 16×16. The quantization unit 730 may quantize the coefficients of the transform block using a quantization matrix which is determined according to the quantization step size and the prediction mode.

The quantization unit 730 may use a quantization step size of a quantization unit adjacent to a current quantization unit as a quantization step size predictor.

The quantization unit 730 may scan neighboring quantization units of the current quantization unit in order of a left quantization unit, an above quantization unit, and an above left quantization unit and generate a quantization step size predictor of the current quantization unit using one or two valid quantization step sizes.

For example, the quantization unit 730 may determine, as the quantization step size predictor, the first quantization step size occurring first in the scanning order among the found valid quantization step sizes or the average value of two valid quantization step sizes found through the scanning. When only one quantization step size is valid, this valid quantization step size may be determined as the quantization step size predictor.

When the quantization step size predictor is determined, the quantization unit 730 feeds a difference value between the quantization step size of the current quantization unit and the quantization step size predictor into the entropy encoding unit 740.

On the other hand, there may be a case where none of a left coding unit, an upper coding unit, and an upper left coding unit of the current coding unit exist or there may be case where a previous coding unit in terms of coding order may not exist in a largest coding unit.

Accordingly, the quantization step size of a previous quantization unit which is immediately prior to the current coding unit in terms of coding order within the largest coding unit, or the quantization step sizes of neighboring coding units adjacent to the current coding unit may become quantization step size candidates.

In this case, the priority in selection of the quantization step size predictor may be in order of 1) the left coding unit of the current coding unit, 2) the above coding unit of the current coding unit, 3) the above left coding unit of the current coding unit, and 4) the previous coding unit to the current coding unit in terms of coding order. The order may be changed. Alternatively, the above left coding unit may not be considered.

The quantized transform block may be fed into the dequantization unit 735 and the scanning unit 731.

The scanning unit 731 scans the quantized coefficients of the transform block and transforms the coefficients into a one-dimensional quantization coefficient set. In this case, since the distribution of the coefficients of the transform block may be dependent on the intra prediction mode, and the scanning method may be selected according to the intra prediction mode.

The coefficient scanning method may vary depending on the size of the transform unit. The scan pattern may vary depending on the intra prediction mode. In this case, the scanning order of the coefficients may be reversed.

When the quantized coefficients are divided into a plurality of sub-sets, an identical scan pattern may be applied to quantized coefficients within each sub-set. On the other hand, a scan pattern for scanning the sub-sets, a zigzag scan pattem or a diagonal scan pattern may be used.

The scan pattern may be preferably determined such that remaining sub-sets are scanned sequentially from a main sub-set including DC. However, the reverse order is also possible.

The scan pattem for scanning the sub-sets may be the same as the scan pattem for scanning the quantized coefficients within each sub-set. The scan pattem for scanning the sub-sets may be determined according to the intra prediction mode.

On the other hand, the encoding apparatus 700 may insert information indicating the position of the last non-zero quantization coefficient within the transform unit TU and the position of the last non-zero quantization coefficient within each subset, into a bitstream to be transmitted to the decoding apparatus 1300.

The dequantization unit 735 may dequantize the quantized coefficients as described above. The inverse transformation unit 725 performs an inverse transform on a per transform unit (TU) basis, thereby recovering the dequantized transform coefficients into residual blocks in the spatial domain.

The adder 795 may generate a reconstruction block by summing the residual block reconstructed by the inverse transformation unit 725 and the predicted block received from the intra prediction unit 750 or the inter prediction unit 760.

In addition, the post-processing unit 770 may perform deblocking filtering for eliminating the blocking effect appearing in a reconstructed picture, a pixel adaptive offset (SAO) application process for compensating the difference value between the original picture and the reconstructed picture on a per pixel basis, and adaptive loop filtering (ALF) for compensating the difference value between the original picture and the reconstructed picture on a per coding unit basis.

The deblocking filtering may be applied to a boundary of a prediction unit (PU) or a transform unit (TU) having a size equal to or larger than a predetermined size.

For example, the deblocking filtering may include determining a boundary to be filtered, determining a boundary filtering strength to be applied to the boundary, determining whether to use a deblocking filter, and selecting a filter to be applied to the boundary when it is determined that the deblocking filter is used.

Whether or not to apply the deblocking filtering depends on whether i) the boundary filtering strength is greater than zero, and ii) whether a value indicating a change in pixel value at the boundary between two blocks (P block and Q block) adjacent the boundary to undergo filtering is less than a first reference value determined by a quantization parameter.

Preferably, two or more filters may be used. If the absolute value of the difference between the values of two pixels located at the block boundary is greater than or equal to a second reference value, a filter which performs relatively weak filtering is selected.

The second reference value is determined by the quantization parameter and the boundary filtering strength.

The sample adaptive offset (SAO) application process is a process of reducing the distortion between pixels in a deblocking-filtered image and pixels in an original image. Whether to apply the sample adaptive offset (SAO) application process is determined on a per picture basis or a per slice basis.

A picture or slice may be divided into a plurality of offset regions, and an offset type may be determined for each of the offset regions. The offset types may include a predetermined number of edge-offset types (for example, four edge offset types) and two band offsets types.

For example, when the offset type is one of the edge-offset types, an edge type is determined per each pixel, and an offset corresponding to the edge type is applied to each pixel. The edge type is determined by comparing the current pixel with neighboring two pixels.

The adaptive loop filtering may be performed according to a value resulting from comparison between an original image and a reconstructed image to which deblocking filtering or adaptive offset is applied.

The picture storage unit 780 receives post-processed image data from the post-processing unit 770, reconstructs an image on a per picture basis, and stores the reconstructed image. The picture is an image corresponding to one frame or to one field.

The inter prediction unit 760 performs motion estimation using one or more pictures stored in the picture storage unit 780, and determines one or more reference picture indexes specifying one or more reference pictures and one or more motion vectors.

In this case, a predicted block (hereinafter, referred to as a prediction block) corresponding to a prediction unit to be encoded may be extracted from the reference picture used for the motion estimation among the pictures stored in the picture storage unit 780 according to the determined one or more reference picture indexes and the determined one or more motion vectors.

The intra prediction unit 750 performs intra prediction coding using the reconstructed pixel values within the picture in which the current prediction unit is included.

The intra prediction unit 750 receives the current prediction unit (PU) to undergo prediction coding, selects one intra prediction mode among a predetermined number of intra prediction modes according to the size of the current block, and performs intra prediction on the current PU using the selected intra prediction mode.

The intra prediction unit 750 may adaptively filter the reference pixels to generate an intra-predicted block. When the reference pixels are not available, the intra prediction unit 750 may generate reference pixels using available pixels.

The entropy encoding unit 740 entropy-encodes the quantization coefficients quantized by the quantization unit 730, intra prediction information received from the intra prediction unit 750, motion information received from the inter prediction unit 760, and the like.

Figure 12:
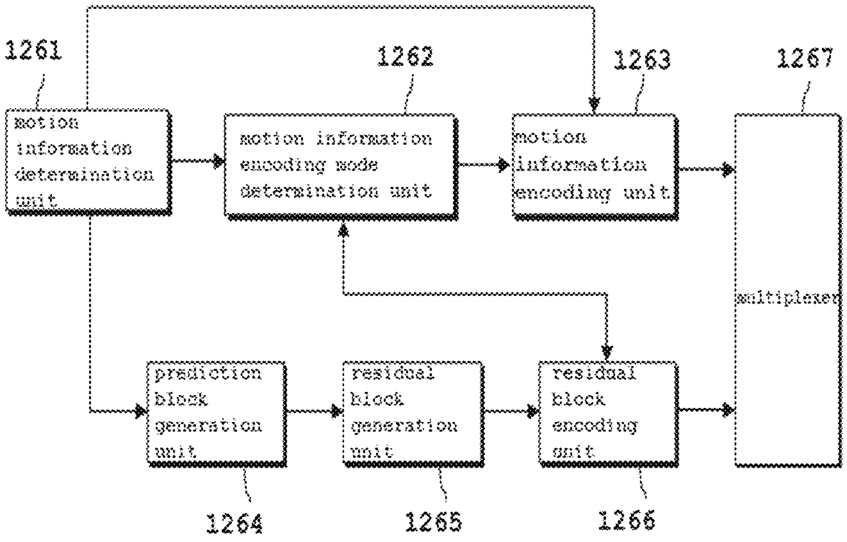
FIG. 12 is a block diagram illustrating an inter prediction method performed in the image encoding apparatus according to one embodiment of the present disclosure.

FIG. 12 is a block diagram used to describe a method of performing inter prediction in an image encoding apparatus according to one embodiment of the present disclosure. The illustrated inter-prediction encoder includes a motion information determination unit 1261, a motion information encoding mode determination unit 1262, a motion information encoding unit 1263, a prediction block generation unit 1264, a residual block generation unit 1265, a residual block encoding unit 1266, and a multiplexer 1267.

Referring to FIG. 12, the motion information determination unit 1261 determines motion information of a current block. The motion information includes a reference picture index and a motion vector. The reference picture index indicates a previously encoded and reconstructed picture.

When the current block is encoded through a unidirectional inter prediction, a reference picture index indicating one of the reference pictures in a list 0 (L0) is included. When the current block is encoded through a bidirectional prediction, a reference picture index indicating one of the reference pictures in the list 0 (L0) and a reference picture index indicating one of the reference pictures in a list 1 (L1) may be included.

In addition, when the current block is encoded through bidirectional prediction, an index indicating one or two pictures among the reference pictures in a composite list LC generated by combining the list 0 and the list 1 may be included.

The motion vector indicates a position of a prediction block within a picture indicated by each reference picture index, and the motion vector may be represented on a per pixel basis (per integer-pixel basis) or a per sub-pixel basis.

For example, the motion vector may have a sub-pixel resolution such as a resolution of half-pel, quarter-pel, one eighth-pel, or one sixteenth-pel. When the motion vector does not have an integer pixel resolution, the prediction block may be generated on a per integer-pixel basis.

The motion information encoding mode determination unit 1262 determines one of a skip mode, a merge mode, and an AMVP mode as an encoding mode for the motion information of the current block.

The skip mode is used when there is a skip candidate having motion information identical to the motion information of the current block and the residual signal is zero. The skip mode is used when the current block which is a prediction unit PU has the same size as the coding unit (CU).

The merge mode is used when there is a merge candidate having motion information identical to the motion information of the current block. The merge mode is used when the current block is different in size from the coding unit (CU). On the other hand, the merge candidate and the skip candidate may be the same one.

The AMVP mode is used when the skip mode and the merge mode are not applicable. An AMVP candidate having a motion vector most similar to the motion vector of the current block is selected as an AMVP predictor.

The motion information encoding unit 1263 encodes motion information according to a method determined by the motion information encoding mode determination unit 1262.

For example, the motion information encoding unit 1263 performs a merge motion vector encoding process when the motion information encoding mode is the skip mode or the merge mode, and performs the AMVP encoding process when the motion information encoding mode is the AMVP mode.

The prediction block generation unit 1264 generates a prediction block using the motion information of the current block. When the motion vector has an integer pixel resolution, the prediction block generation unit 1264 copies the block corresponding to the position indicated by the motion vector in the picture indicated by the reference picture index into the prediction block of the current block.

On the other hand, when the motion vector does not have an integer-pixel resolution, the prediction block generation unit 1264 generates the pixels of a prediction block from the integer pixels in the picture indicated by the reference picture index.

In this case, the prediction pixels are generated using an 8-tap interpolation filter for luminance pixels, and the prediction pixels are generated using a 4-tap interpolation filter for chrominance pixels.

The residual block generation unit 1265 generates a residual block from the current block and the prediction block of the current block. When the current block has a size of 2N×2N, the residual block generation unit 1265 generates a residual block using the current block and a 2N×2N predicted block corresponding to the current block.

On the other hand, when the current block used for prediction has a size of 2N×N or N×2N, two prediction blocks for respective 2N×N blocks constituting one 2N×2N block are obtained, and a 2N×2N final prediction block is generated using the two 2N×N prediction blocks.

In addition, a residual block of a 2N×2N size may be generated using the 2N×2N prediction block. Overlap smoothing may be applied to boundary pixels to eliminate the discontinuity at the boundary between two 2N×N prediction blocks.

The residual block encoding unit 1266 may divide the residual block into one or more transform units (TU), and each of the transform units (TU) may be transform-encoded, quantized, and entropy-encoded.

The residual block coding unit 1266 may transform the residual block generated through inter prediction by using an integer-based transform matrix, and the transform matrix may be an integer-based DCT matrix.

On the other hand, the residual block coding unit 1266 uses a quantization matrix to quantize the coefficients of the residual block transformed by using the transformation matrix. The quantization matrix may be determined according to the quantization parameter.

The quantization parameter is determined for each coding unit (CU) having a size equal to or larger than a predetermined size. When the current coding unit (CU) is smaller than the predetermined size, the quantization parameter of only the first coding unit appearing first in coding order among coding units having a size equal to or larger than the predetermined size is encoded, and the quantization parameters of the remaining coding units (CU) are not encoded because the quantization parameters of the remaining coding units (CU) are the same as the first coding unit (CU).

In addition, the coefficients of the transform block may be quantized using a quantization matrix determined according to the quantization parameter and the prediction mode.

Quantization parameters determined for the respective coding units (CU) equal to or larger than a predetermined size can be predictively encoded using the quantization parameter of a coding unit (CU) adjacent to the current coding unit (CU).

One or two valid quantization parameters are retrieved by searching the left coding unit (CU) and the upper coding unit (CU) in this order, and a quantization parameter predictor of the current coding unit (CU) is generated using the one or two retrieved valid quantization parameters.

For example, the first appearing valid quantization parameter of the quantization parameters retrieved in the above order may be determined as the quantization parameter predictor of the current block. Alternatively, the first appearing valid quantization parameter may be determined as the quantization parameter predictor by searching the left coding unit (CU) of the current coding unit and a preceding coding unit (CU) to the current coding unit in this order in terms of coding order.

The coefficients of the quantized transform block are scanned and transformed into a one-dimensional quantization coefficients set, and a scanning pattern may be differently set according to the entropy encoding mode.

For example, when encoded by CABAC, the quantization coefficients coded through inter prediction can be scanned in a predetermined manner (i.e., with a zigzag or diagonal raster scan). When encoded by CAVLC, the scanning may be performed in a manner different from the above described scanning manner.

For example, the scanning is performed for inter prediction coding, the zigzag scan may be used. On the other hand, when the scanning is performed for intra prediction coding, the scan method may be determined according to an intra prediction mode to be used. The coefficient scanning method may be determined differently depending on the size of the transform unit.

The scanning pattern may vary depending on a selected mode of the directional prediction modes, and the quantization coefficients may be scanned in the reverse direction.

The multiplexer 1267 multiplexes the motion information encoded by the motion information encoding unit 1263 and the residual signal encoded by the residual block encoding unit 1266.

For example, in the case of the skip or merge mode, the motion information includes only an index indicating a predictor. In case of the AMVP mode, the motion information may include a reference picture index, a difference motion vector, and an AMVP index of the current block.

Hereinafter, one embodiment of the operation of the intra prediction unit 750 illustrated in FIG. 7 will be described in detail.

The intra prediction unit 750 receives prediction mode information and the size of the prediction unit PU from the picture partitioning unit 710 and reads reference pixels out of the picture storage unit 780 to determine the intra prediction mode of the prediction unit (PU).

The intra prediction unit 750 determines whether to create reference pixels by examining whether there are unavailable pixels, and the reference pixels can be used to determine one intra prediction mode for the current block among a plurality of intra prediction modes.

When the current block is located at the upper boundary of the current picture, pixels adjacent to the upper boundary of the current block are not defined. When the current block is located at the left boundary of the current picture, pixels adjacent to the left boundary of the current block are not defined. These undefined pixels are considered unavailable pixels.

In addition, when the current block is located at a slice boundary and thus pixels adjacent to the upper boundary or the left boundary of the slice are not previously encoded and reconstructed pixels, those pixels are also considered unavailable pixels.

As described above, when there are no pixels located to the left or to the top of the current block, or when there are no pixels that are previously encoded and reconstructed, an intra prediction mode for prediction of the current block is determined based on only available pixels.

On the other hand, these reference pixels at the unavailable pixel positions can be generated by copying the pixels values from the available reference pixels of the current block. For example, when the pixels in the above block of the current block are unavailable, the pixels in the left block of the current block are partially or entirely used to generate the pixels in the upper block, and vice versa.

That is, these reference pixels can be generated by copying the pixel values from the closest available reference pixels to the unavailable pixel position in a predetermined direction. On the other hand, when there are no available reference pixels adjacent to the current block in the predetermined direction, pixel values of the closest available reference pixels in the opposite direction may be copied to generate reference pixels.

Although there are pixels in the above block or the left block of the current block, there may be a case where the pixels existing in the above block or the left block cannot be used as available reference pixels depending on the encoding mode of the above block or the left block.

For example, when an above block to which reference pixels adjacent to the upper boundary of the current block belong is a previously inter-predictively encoded and then reconstructed block, the reference pixels are determined to be unavailable pixels.

In this case, available reference pixels may be generated using pixels belonging to a previously intra-predictively encoded and reconstructed neighboring block adjacent to the current block. The encoding apparatus 700 may transmit information indicating the fact that available reference pixels are determined according to an encoding mode, to the decoding apparatus 1300.

The intra prediction unit 750 determines an intra prediction mode of the current block by using the reference pixels. The number of intra prediction modes that can be applied to the current block is determined according to the size of the current block.

For example, when the current block has an 8×8 size, a 16×16 size, or a 32×32 size, 34 intra prediction modes are available. On the other hand, when the current block has a 4×4 size, 17 intra prediction modes are available. In addition, the 34 intra prediction modes may be further subdivided into 67 intra prediction modes, depending on a block size.

The 67, 34, or 17 intra prediction modes include at least one non-directional mode and a plurality of directional modes.

The at least one non-directional mode include DC mode and/or planar mode. When the DC mode and the planar mode are categorized as the non-directional modes, there may be 67 or 35 intra prediction modes for the intra prediction of the current block, regardless of the size of the current block.

In this case, two non-directional modes (DC mode and planar mode) and 64 or 33 directional modes are available for prediction of the current block.

When the planar mode is used, the value of at least one pixel (or a predicted value of the pixel, hereinafter, referred to as a first reference value) which is located at a bottom right corner of the current block and the reference pixels are used to generate a prediction block of the current block.

Particularly, to use an increased number of directional modes (i.e., 65 directional modes), the intra prediction unit 750 may use a most probable mode (MPM) mechanism as an intra mode encoding/decoding method. In this case, a predetermined number (for example, N) of most probable modes (MPMs) may be selected and the optimum intra directional mode may be determined among the MPMs. Here, N may be an integer of one or greater (namely, any one of 1, 2, 3, 4, 5, . . . ). A description given below relates to one embodiment of the invention, in which six MPMs are extracted.

The intra prediction unit 750 may construct an MPM list by obtaining intra modes of neighboring blocks corresponding to candidate positions, deriving an intra mode of the current block, or using a basic intra mode.

An initial MPM list may include 5 intra modes of neighboring blocks, planar mode, and DC mode. The intra prediction unit 750 may construct the MPM list including unique modes by eliminating the redundancy in the modes according to sequential processing operations. Accordingly, the initial intra modes are arranged in order of left, above, planar, DC, bottom left, above right, and above left modes. When there is any space in a six-mode MPM list, derived modes may be added to fill the space. For example, the modes to be added to the MPM list may be derived by adding −1 or +1 to the mode numbers of the directional modes included in the MPM list.

When the MPM list still has a space even after the above-described process is performed, basic modes may be added to the list according to the order described below. Basic modes: vertical, horizontal, mode 2, and diagonal mode. All through these processes, a list with six unique modes can be constructed.

The configuration of an image decoding apparatus according to one embodiment of the present invention can be derived from the configuration of the image encoding apparatus 700 which has been described above with reference to FIGS. 7 through 12, and an image can be decoded by performing the processes of the image encoding method described above with reference to FIGS. 7 through 12 in the reverse order.

Figure 13:
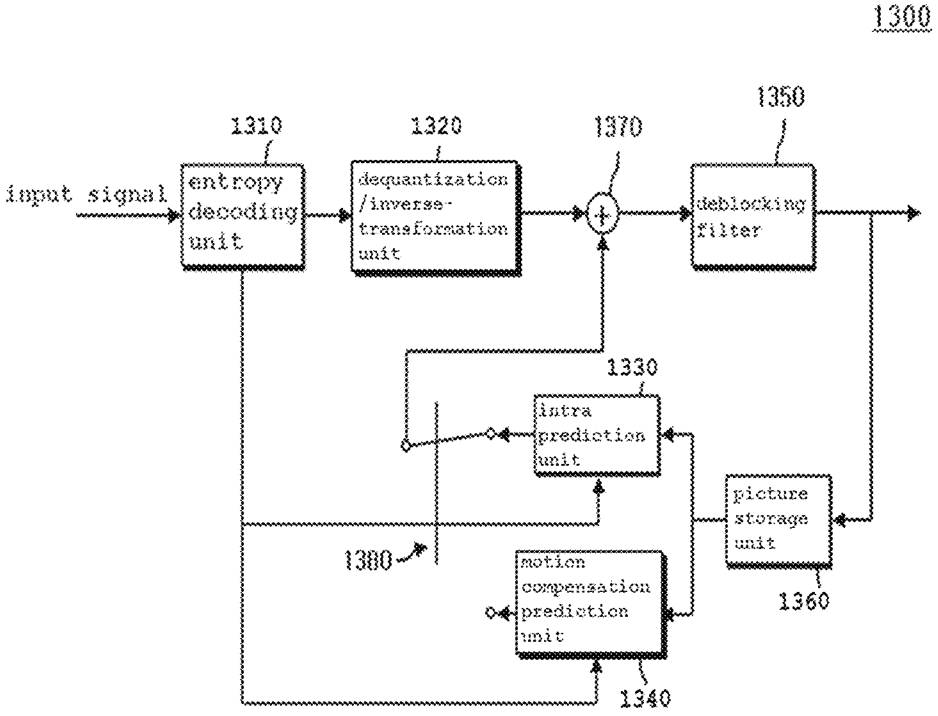
FIG. 13 is a block diagram illustrating the configuration of an image decoding apparatus according to one embodiment of the present disclosure.

FIG. 13 is a block diagram illustrating the configuration of a moving image decoding apparatus according to one embodiment of the present invention. A decoding apparatus 1300 includes an entropy decoding unit 1310, a dequantization/inverse-transformation unit 1320, an adder 1370, a deblocking filter 1350, a picture storage unit 1360, an intra prediction unit 1330, a motion compensation prediction unit 1340, and an intra/inter changeover switch 1380. FIG. 13 illustrates one embodiment of FIG. 2.

The entropy decoding unit 1310 receives a coded bitstream from an image encoding apparatus 80, decodes and parses the bitstream into an intra prediction mode index, motion information, a quantization coefficient sequence, etc., and feeds the decoded motion information into the motion compensation prediction unit 1340.

The entropy decoding unit 1310 transfers the intra prediction mode index to the intra prediction unit 1330 and the dequantization/inverse-transformation unit 1320 so that a dequantization coefficient sequence can be transferred to the dequantization/inverse-transformation unit 1320.

The dequantization/inverse-transformation unit 1320 transforms the quantization coefficient sequence into a two-dimensionally arranged dequantization coefficients set using any one of a plurality of scanning patterns. For example, the selection of the scanning pattern is performed based on a prediction mode (intra prediction or inter prediction) of the current block, and an intra prediction mode when the prediction mode is intra.

The dequantization/inverse-transformation unit 1320 reconstructs the quantization coefficients by applying a quantization matrix selected from among a plurality of quantization matrices to the two-dimensionally arranged dequantization coefficients set.

Depending on the size of the current block to be reconstructed, a different quantization matrix may be applied. For blocks having the same size, different quantization matrices may be used according to at least one of the prediction mode of the current block and the intra prediction mode of the current block.

The dequantization/inverse-transformation unit 1320 may perform a dequantization process on the reconstructed quantization coefficients to generate a residual block. The dequantization process is performed on a per transform unit (TU) basis.

The adder 1370 reconstructs an image block by summing the residual block reconstructed by the dequantization/inverse-transformation unit 1320 and a prediction block generated by the motion compensation prediction unit 1340.

The deblocking filter 1350 performs a deblocking filtering process on the reconstructed image generated by the adder 1370 to reduce the deblocking artifacts attributable to the image loss occurring in the quantization process.

The picture storage unit 1360 is a frame memory for storing a locally decoded image that results from the deblocking filtering process performed by the deblocking filter 1350.

The intra prediction unit 1330 reconstructs the intra prediction mode of the current block on the basis of the intra prediction mode index received from the entropy decoding unit 1310, and generates a prediction block according to the reconstructed intra prediction mode.

The motion compensation prediction unit 1340 generates a prediction block corresponding to the current block from a picture stored in the picture storage unit 1360. The motion compensation prediction unit 1340 may generate a prediction block by using one selected interpolation filter when motion compensation with a decimal precision is applied.

The intra/inter changeover switch 1380 may provide the adder 1370 with a prediction block which is generated by either the intra prediction unit 1330 or the motion compensation prediction unit 1340 according to the encoding mode.

Figure 14:
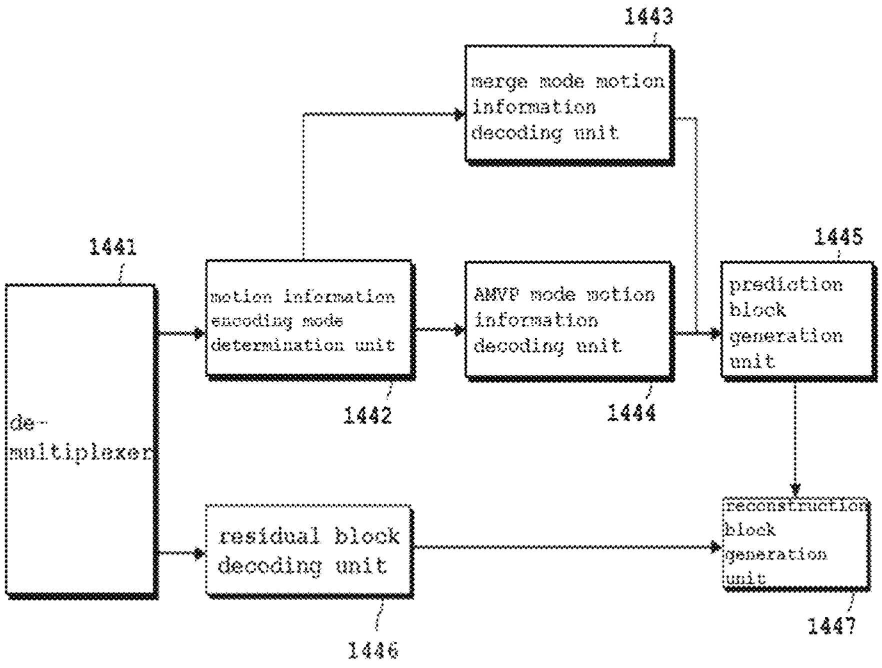
FIG. 14 is a block diagram illustrating an inter prediction process performed in the image decoding apparatus according to one embodiment of the present disclosure.

FIG. 14 is a block diagram used to describe an inter prediction process performed in an image decoding apparatus according to one embodiment of the present disclosure.

An inter prediction decoder includes a de-multiplexer 1441, a motion information encoding mode determination unit 1442, a merge mode motion information decoding unit 1443, an AMVP mode motion information decoding unit 1444, a prediction block generation unit 1445, a residual block decoding unit 1446, and a reconstructed-block generation unit 1447. Here, the merge mode motion information decoding unit 1443 and the AMVP mode motion information decoding unit 1444 may be included in a motion information decoding unit (not illustrated).

Referring to FIG. 14, the de-multiplexer 1441 demultiplexes the received bitstream to recover the currently encoded motion information and the encoded residual signals included in the received bitstream. The de-multiplexer 1441 transmits the recovered motion information to the motion information encoding mode determination unit 1442 and the recovered residual signal to the residual block decoding unit 1446.

The motion information encoding mode determination unit 1442 determines the motion information encoding mode of the current block. The motion information encoding mode determination unit 1442 may determine that the motion information encoding mode of the current block is encoded with a skip mode when a skip flag skip_flag in the received bitstream has a value of one.

The motion information encoding mode determination unit 1442 may determine that the motion information encoding mode of the current block is encoded with a merge mode when the skip flag skip_flag in the received bitstream has a value of zero and the motion information received from the de-multiplexer 1441 has only a merge index.

In addition, the motion information encoding mode determination unit 1442 may determine that the motion information encoding mode of the current block is encoded with an AMVP mode when the skip flag skip_flag in the received bitstream has a value of zero and the motion information received from the de-multiplexer 1441 has a reference picture index, a differential motion vector, and an AMVP index.

The merge mode motion information decoding unit 1443 is activated when the motion information encoding mode determination unit 1442 determines that the motion information encoding mode of the current block is the skip or merge mode. The AMVP mode motion information decoding unit 1444 may be activated when the motion information encoding mode determination unit 1442 determines that the motion information encoding mode of the current block is the AMVP mode.

The prediction block generation unit 1345 generates a prediction block of the current block using the motion information reconstructed by the merge mode motion information decoding unit 1443 or the AMVP mode motion information decoding unit 1444.

When a motion vector has an integer-pixel resolution, a block corresponding to a position indicated by a motion vector in a picture indicated by a reference picture index is copied to generate a prediction block of the current block.

On the other hand, the motion vector does not have an integer-pixel resolution, pixels of a prediction block (hereinafter, referred to as prediction pixels) are generated from integer pixels in a picture indicated by a reference picture index. In this case, the prediction pixels are generated using an eight-tap interpolation filter for luminance pixels and a four-tap interpolation filter for chrominance pixels.

The residual block decoding unit 1446 generates a two-dimensional quantization coefficient block by entropy-decoding the residual signal and inverse-scanning the entropy decoded coefficients. An inverse scanning method may vary based on an entropy decoding method.

For example, a diagonal raster inverse-scan method may be used for CABAC-based decoding, and a zigzag inverse-scan method may be used for CAVLC-based decoding. Furthermore, the inverse scanning method may be determined based on the size of a prediction block.

The residual block decoding unit 1446 dequantizes the generated coefficient block using a dequantization matrix. In order to derive a quantization matrix, a quantization parameter is reconstructed. A quantization step size is reconstructed for each coding unit having a predetermined size or larger.

The residual block decoding unit 1446 reconstructs the residual block by inversely transforming the dequantization coefficient block.

The reconstruction block generation unit 1447 generates a reconstruction block by summing a prediction block generated by the prediction block generation unit 1445 and a residual block generated by the residual block decoding unit 1446.

Hereinafter, a process of reconstructing a current block through intra prediction according to an embodiment will be described with reference to FIG. 13.

First, the intra prediction mode of the current block is obtained by decoding the received bitstream. To this end, the entropy decoding unit 1310 refers to one of a plurality of intra prediction mode tables to reconstruct a first intra prediction mode index of the current block.

The plurality of intra prediction mode tables are tables shared by the encoding apparatus 700 and the decoding apparatus 1300. One table selected from among the intra prediction mode tables according to the distribution of intra prediction modes of a plurality of blocks adjacent to the current block may be used.

For example, when the intra prediction mode of the left block of the current block is the same as the intra prediction mode of the above block of the current block, a first intra prediction mode table is used to reconstruct a first intra prediction mode index of the current block. Conversely, when the intra prediction mode of the left block of the current block is not the same as the intra prediction mode of the abo e block of the current block, the first intra prediction mode index of the current block may be reconstructed by using a second intra prediction mode table.

As another example, when the intra prediction modes of the above block and the left block of the current block are both the directional intra prediction modes and when an angle between the orientations of the intra prediction modes of the above block and the left block is within a predetermined angle range, the first intra prediction mode index of the current block may be reconstructed using the first intra prediction mode table. On the other hand, when the angle is outside the predetermined angle range, the first intra prediction mode index of the current block may be reconstructed using the second intra prediction mode table.

The entropy decoding unit 1310 transmits the first intra prediction mode index of the reconstructed current block to the intra prediction unit 1330.

The intra prediction unit 1330 receiving the first intra prediction mode index may determine the maximum allowable mode of the current block as the intra prediction mode of the current block when the index has the minimum value (i.e., when the index is zero).

On the other hand, when the index has a value other than zero, the intra prediction unit 1330 compares the index indicated by the maximum allowable mode of the current block and the first intra prediction mode index, and determines an intra prediction mode corresponding to a second intra prediction mode index obtained by adding +1 to the first intra prediction mode index as the intra prediction mode of the current block when the first intra prediction mode index is not smaller than the index indicated by the maximum allowable mode of the current block. When not, the intra prediction unit 1330 may determine an intra prediction mode corresponding to the first intra prediction mode index as the intra prediction mode of the current block.

A set of allowable intra prediction modes of the current block may include at least one non-directional mode and a plurality of directional modes.

Examples of the at least one non-directional mode may be DC mode and/or planar mode. In addition, either the DC mode or the planar mode may be adaptively included in the allowable intra prediction mode set.

To this end, information specifying the non-directional mode(s) included in the allowable intra prediction modes set may be included in a picture header or a slice header.

Meanwhile, when an MPM flag is present, the intra prediction unit 1330 can derive MPM candidate modes from the neighboring blocks adjacent to an encoding target block and generate an MPM list using the derived MPM candidate modes. In this case, the intra prediction unit 1330 may add the MPM candidates derived from the neighboring blocks to the MPM list. The intra prediction unit 1330 encodes the intra prediction mode using the generated MPM list.

In particular, in the embodiment of the present invention, the intra prediction unit 1330 may restrict the allowable intra prediction modes of the current block on the basis of at least one of the coefficients distributions of the inversely transformed blocks, the intra prediction modes of the neighboring blocks, and the size/shape of the current block, and may restrict prediction mode candidates when generating the MPM candidates list. Here, the restriction processing may mean that only predetermined intra prediction modes are allowed or that predetermined intra prediction modes are not allowed.

For example, as the allowable intra prediction modes for the current block, only predetermined intra prediction modes may be allowed on the basis of information acquired from at least one of the coefficients distributions of the inversely transformed blocks, the intra prediction modes of the neighboring blocks, the size of the current block, and the shape of the current block. Alternatively, for example, only a predetermined intra prediction mode may be allowed to generate the MPM candidate mode list on the basis of information acquired from at least one of the coefficients distributions of the inversely transformed blocks, the intra prediction modes of the neighboring blocks, the size of the current block, and the shape of the current block.

In addition, in the embodiment of the present invention, the intra prediction unit 1330 may adaptively perform a process of restricting the allowable intra prediction modes of the current block on the basis of at least one of the coefficients distribution of the inversely transformed blocks, the intra prediction modes of the neighboring blocks, and the size and shape of the current block, and may direction-adaptively process the prediction mode candidates when generating the MPM candidate mode list. Here, the direction adaptive process may mean performing the process based on information on a predetermined direction.

Namely, on the basis of information on a predetermined direction acquired from at least one of the coefficients distributions of the inversely transformed blocks, the intra prediction modes of the neighboring blocks, the size of the current block, and the shape of the current block, allowable intra prediction modes for the current block may be determined. Alternatively, to generate the MPM candidate mode list, MPM candidates may be determined on the basis of information on a predetermined direction acquired from at least one of the coefficients distributions of the inversely transformed block, the intra prediction modes of the neighboring blocks, the size of the current block, and the shape of the current block. Alternatively, a predetermined mode from among non-MPM modes may be selected on the basis of predetermined direction information acquired from at least one of the coefficients distributions of the inversely transformed block, the intra prediction modes of the neighboring blocks, the size of the current block, and the shape of the current block. The predetermined mode may be encoded/decoded using a relatively small bin compared to the non-MPM modes.

The direction-adaptively processing the allowable intra prediction modes of the current block may mean determining allowable intra prediction modes on the basis of the size and/or shape of the current block. For example, when the shape of the current block is rectangular, the predetermined directional modes may be restricted according to a ratio of the width and height of the current block. Alternatively, the predetermined directional modes may be restricted according to the size and/or direction of a diagonal component. The predetermined directional mode may be a mode having a horizontal directionality or a vertical directionality.

In this case, by changing reference pixels used to predict the restricted directional modes, modes corresponding to the changed reference pixels may be determined as allowable intra prediction modes instead of the restricted directional modes. For example, when the current block is a rectangular 2N×N block, the allowable intra prediction modes may be restricted to intra prediction modes which are modes for performing prediction using reference pixels in a lower left block. Instead of the restricted modes, intra prediction modes which are modes for performing prediction using reference pixels in an above right block may be determined as allowable intra prediction modes. In addition, for example, when the current block is a rectangular N×2N block, allowable intra prediction modes are restricted to intra prediction modes which are modes for performing prediction using reference pixels in an above right block. Alternatively, instead of the restricted modes, intra prediction modes which are modes for performing prediction using reference pixels in a lower left block are determined as allowable intra prediction modes.

In addition, the number of the restricted intra prediction modes and/or intra prediction modes to replace the restricted intra prediction modes may vary according to the size and/or shape of the current block. For example, the number may vary depending on the ratio of the width and height of the current block or the size and/or direction of the diagonal component. In addition, the number of the restricted intra prediction modes may differ from the number of intra prediction modes to replace the restricted intra prediction modes.

Next, to generate an intra-predicted block (a prediction block generated through intra prediction), the intra prediction unit 1330 reads reference pixels out of the picture storage unit 1360 and determines whether there are unavailable reference pixels.

The determination may be performed according to whether there are reference pixels used to generate an intra-predicted block by applying the decoded intra prediction mode of the current block.

Next, the intra prediction unit 1330 may generate reference pixels disposed at unavailable pixel positions by using previously reconstructed available reference pixels when it is necessary to generate reference pixels.

The definition of unavailable reference pixels and the method of generating the reference pixels may be the same used in the intra prediction unit 750 illustrated in FIG. 7. However, reference pixels used to generate an intra-predicted block may be selectively reconstructed, depending on the decoded intra prediction mode of the current block.

In addition, the intra prediction unit 1330 determines whether to apply a filter to reference pixels to generate a prediction block. That is, the intra prediction unit 1330 may determine whether to apply a filter to reference pixels to generate an intra-predicted block of the current block, based on the decoded intra prediction mode and the size of the current prediction block.

The problem of blocking artifacts is severer as the block size is larger. As the block size increases, the number of prediction modes for filtering reference pixels increases. When the block size is greater than a predetermined size, the block is considered a flat region. Therefore, to reduce the computation complexity, reference pixels may not be filtered.

When it is determined that filtering needs to be applied to the reference pixels, the intra prediction unit 1330 filters the reference pixels using a filter.

Two or more filters may be adaptively used according to a step difference between the reference pixels. It is preferable that filter coefficients of the filter are symmetric.

The two or more filters may be adaptively applied according to the size of the current block. When a filter is applied, a narrow band filter may be applied to a smaller block and a broad band filter may be applied to a larger block.

When using DC mode for prediction, a prediction block is generated with a mean value of pixel values of reference pixels, so that filtering needs not be applied. When an image has a vertical mode having correlation with a vertical direction or a horizontal mode having correlation with a horizontal direction, application of filtering to reference pixels may not be needed.

In this way, since application of filtering has correlation with the intra prediction mode of the current block, reference pixels may be adaptively filtered depending on the intra prediction mode of the current block and the size of the prediction block.

Next, the intra prediction unit 1330 generates a prediction block using the reference pixels or the filtered reference pixels according to the reconstructed intra prediction mode. The generation of the prediction block may be performed in the same way as in the encoding apparatus 700. Therefore, the details of the generation of the prediction block for decoding may not be described.

The intra prediction unit 1330 determines whether to filter the generated prediction block. Whether to perform filtering may be determined based on information included in a slice header or a coding unit header or according to the intra prediction mode of the current block.

When the generated prediction block is determined to be filtered, the intra prediction unit 1330 may generate a new pixel by filtering a pixel at a specific position of the prediction block using available reference pixels adjacent to the current block.

For example, when DC mode is used, among all of the prediction pixels, some prediction pixels adjacent to the reference pixels may be filtered using the reference pixels adjacent to the prediction pixels.

Accordingly, prediction pixels are filtered using one or two reference pixels according to the positions of the prediction pixels, and filtering of the prediction pixels in DC mode may be applied to prediction blocks of all sizes.

On the other hand, in the case of a vertical mode, among the prediction pixels of a prediction block, prediction pixels adjacent to the left reference pixels may be modified using reference pixels other than above reference pixels that are used to generate the prediction block.

In a similar manner, in the case of a horizontal mode, among the generated prediction pixels, the prediction pixels adjacent to the above reference pixels may be modified using the reference pixels other than the left reference pixels that are used to generate the prediction block.

The filtering of the prediction pixels may mean performing filtering using a value predicted from a predetermined intra prediction mode and one or more reference pixels. For example, the filtering may be performed by weighted-summing a predicted value generated using a directional prediction and one or more values of one or more reference pixels adjacent to the current block.

In this way, the current block may be reconstructed using the reconstructed prediction block of the current block and the residual block of the current block.

Figure 15:
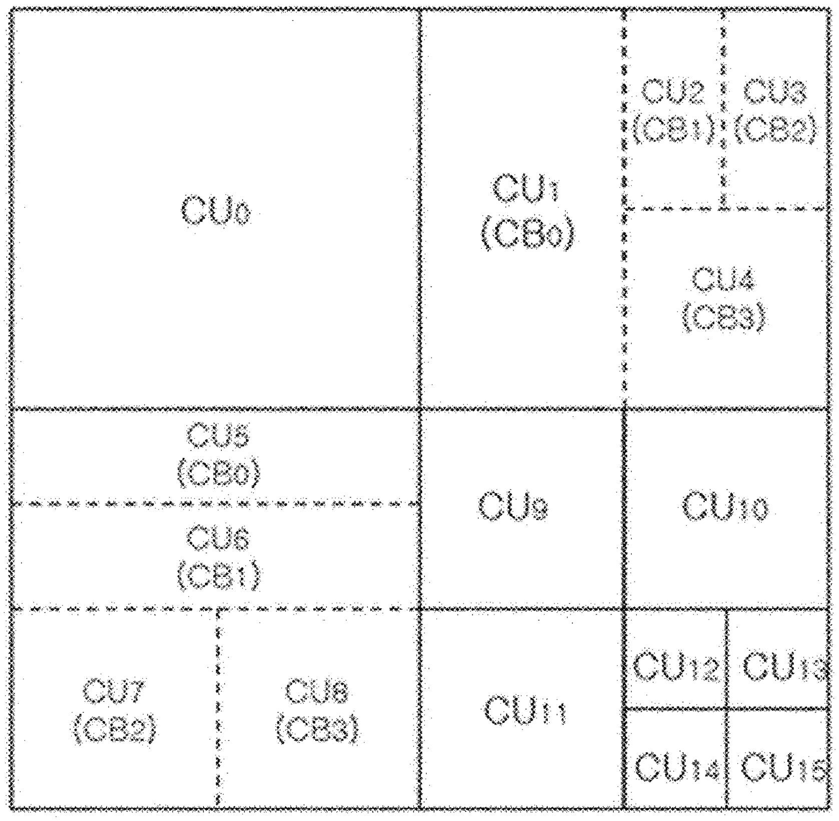
FIG. 15 is a diagram illustrating a method of partitioning an image into blocks and performing image processing on a per block basis, according to another embodiment of the present disclosure.

FIG. 15 is a diagram illustrating a method of partitioning an image into blocks and performing image processing on a per block basis, according to another embodiment of the present disclosure.

Referring to FIG. 15, a coding tree unit (CTU) having a maximum size of 256×256 is partitioned using a quad tree structure to generate four square coding units (CUs).

Among the CUs resulting from the quad tree structure partitioning, at least one CU may be partitioned using a binary tree structure to produce two CUs having a rectangular shape. At least one of the CUs may be further partitioned using a ternary tree structure.

Among the CUs resulting from the quad tree structure partitioning, at least one CU may be further partitioned using a quad tree structure to produce four square CUs.

Among the CUs resulting from the binary tree structure partitioning, at least one CU may be further partitioned through binary tree structure partitioning to produce two smaller CUs having a rectangular shape.

Among the CUs resulting from the quad tree partitioning, at least one CU may be further partitioned into smaller CUs having a square shape or a rectangular shape through quad tree structure partitioning or binary tree structure partitioning.

Coding blocks (CBs) resulting from the binary tree structure partitioning may not be further partitioned but may be used for prediction and transform as it is. The size of the prediction units (PUs) and transform units (TUs) in the coding block (CB) illustrated in FIG. 15 may have the same size as the corresponding CB.

Each of the CUs produced through the quad tree structure partitioning may be partitioned into one PU or into two or more PUs using the partitioning method that has been described with reference to FIGS. 9 and 10.

Each of the coding units resulting from the quad tree structure partitioning may be partitioned into one TU or two or more TUs using the partitioning method that has been described with reference to FIG. 11, and each of the TUs may have a maximum size of 64×64 pixels.

A syntax structure used to partition an image into blocks and to process the image on a per block basis may represent partitioning information using a flag. For example, whether a CU is partitioned may be represented using a flag split_cu_flag, and the depth of CUs generated through the binary tree structure partitioning may be represented using a flag binary depth. In addition, whether a CU is partitioned through binary tree structure partitioning may be represented using an additional flag binary_split_flag.

Image encoding and decoding may be performed on blocks (for example, CUs, PUs, and TUs) that result from the partitioning that has been described with reference to FIG. 15 by applying the methods that have been described with reference to FIGS. 7 through 14.

Herein below, referring to FIGS. 16 through 21, a method of partitioning a CU into one TU or two or more TUs according to another embodiment will be described.

According to the embodiment of the present invention, a CU may be partitioned into TUs which are generated through binary tree structure partitioning and each of which is a basic unit for transforming a residual block.

Figure 16:
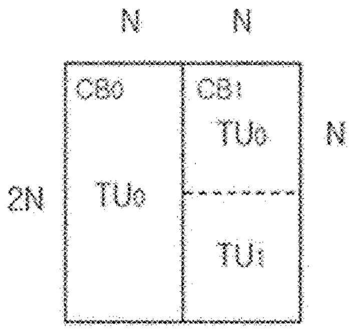
FIG. 16 is a diagram illustrating a method of partitioning an image into blocks and performing image processing on a per block basis, according to a further embodiment of the present disclosure.
Figure 16:
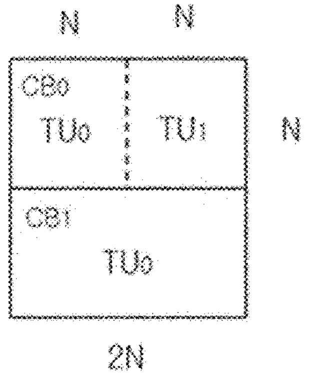

FIG. 16 is a diagram used to describe a method of partitioning an image into blocks and performing image processing on a per block basis, according to a further embodiment of the present disclosure.

Referring to FIG. 16, at least one of rectangular coding blocks CB0 and CB1 which are generated through binary tree structure partitioning and each of which has a size of N×2N or 2N×N may be further partitioned into square transform units TU0 and TU1 having an N×N size through binary tree structure partitioning.

As described above, the block-based image encoding method may perform prediction, transform, quantization, and entropy encoding processes.

In the prediction process, a prediction signal is generated by referring to a current block to be encoded, a previously encoded image, or previously encoded neighboring images, and a differential signal that is a difference between the prediction signal and the current block is calculated.

In the transform process, the transform may be performed on the differential signal (an input signal), using various transform functions. The transform signals are categorized into DC coefficients and AC coefficients, and energy compaction is performed to increase coding efficiency.

In the quantization process, quantization is performed on input transform coefficients, and then entropy encoding is performed on the quantized signal to generate an encoded image.

The image decoding method may be performed in the reverse sequence to the encoding method, and image quality distortion may occur in the quantization process.

As a method of improving coding efficiency and reducing image quality distortion, the size or shape of a TU and the transform function used may vary according to the distribution of difference signals (input signals) in the transform process and the nature of the image.

For example, when finding a similar block to the current block through the block-based motion estimation in the prediction process using a cost measurement method, such as sum of absolute difference (SAD) or mean square error (MSE), the distribution of the difference signals may occur in a variety of forms depending on the nature of the image.

Thus, by performing a transform by selecting the size or shape of the transform unit (TU) on the basis of the various distribution forms of the difference signals, the efficient coding can be carried out.

For example, when the difference signal occurs in any of the coding blocks (CBx), the effective transform can by performed by dividing the coding block (CBx) into two transform units (TUs) through binary tree structure partitioning. It is generally considered that a DC value represents the average value of input signals. Therefore, when the difference signals are input in the transform process, since each of the coding blocks (CBx) is partitioned into two transform units (TUs), the DC value can be effectively represented.

Figure 17:
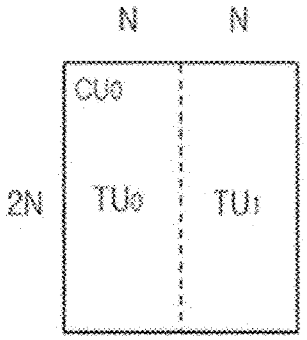
FIG. 17 is a diagram illustrating one embodiment of a method of forming a transform unit by partitioning a coding unit using a binary tree structure, according to one embodiment of the present disclosure.
Figure 17:
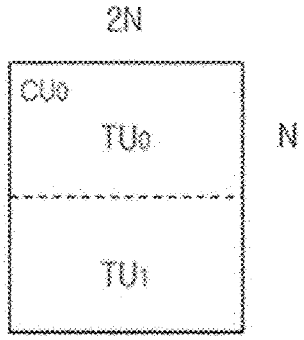

Referring to FIG. 17, a square 2N×2N coding unit CUO may be partitioned into two rectangular transform units TU0 and UT1 having an N×2N size or a 2N×N size through binary tree structure partitioning.

According to another embodiment of the present invention, as described above, by performing binary tree structure partitioning on the coding unit (CU) two or more times, a plurality of transform units (TUs) is generated.

Figure 18:
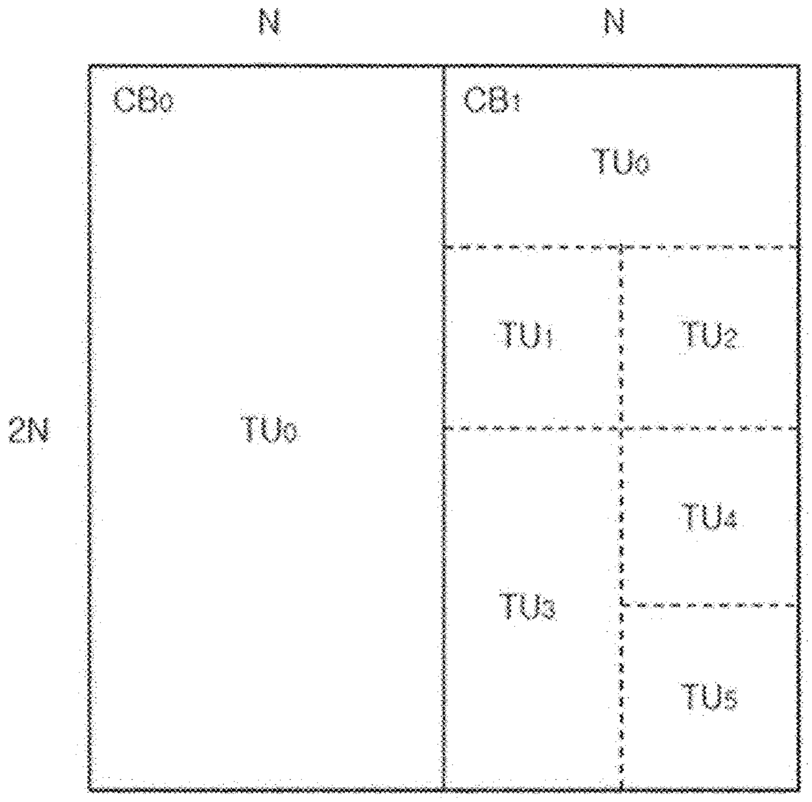
FIG. 18 is a diagram illustrating a further embodiment of a method of partitioning an image into blocks and performing image processing on a per block basis, according to one embodiment of the present disclosure.

Referring to FIG. 18, an N×2N rectangular coding block CB1 is first partitioned into two N×N blocks through binary tree structure partitioning, and then each of the two N×N blocks is further partitioned into N×N/2 rectangular blocks or N/2×N rectangular blocks through the binary tree structure partitioning. Then, the N/2×N or N×N/2 blocks are further partitioned into N/2×N/2 square transform units TU1, TU2, TU4, and TU5 through binary tree structure partitioning.

Figure 19:
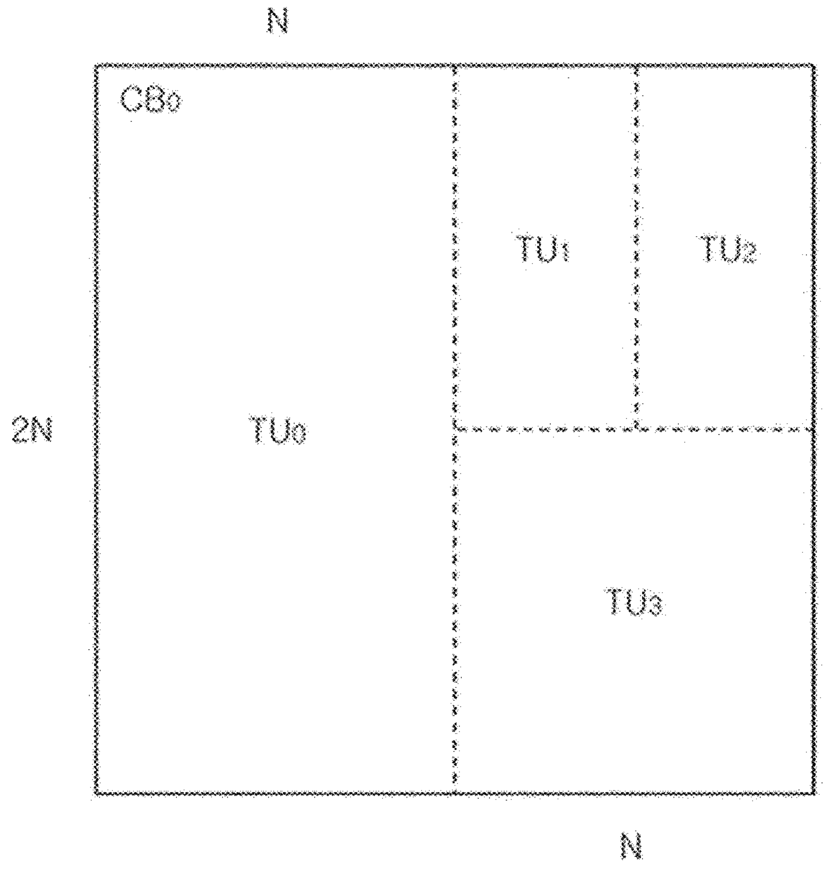
FIGS. 19 and 20 are diagrams illustrating other embodiments of a method of partitioning an image into blocks and performing image processing on a per block basis, according to one embodiment of the present disclosure.

Referring to FIG. 19, a 2N×2N square coding block CB0 may be partitioned through binary tree structure partitioning to generate N×2N blocks, the N×2N bocks may be further partitioned through the binary tree structure partitioning to generate N×N square blocks, and the N×N square blocks may be further partitioned through the binary tree structure partitioning to generate N/2×N rectangular transform units TU1 and TU2.

Figure 20:
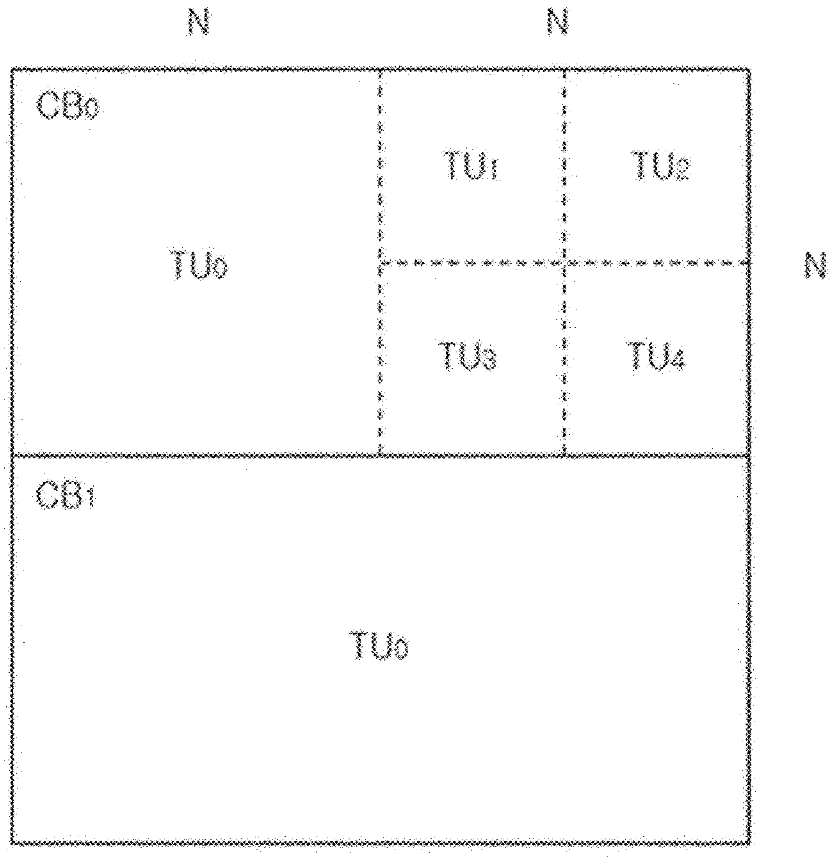

Referring to FIG. 20, a 2N×N rectangular coding block CB0 may be partitioned through binary tree structure partitioning to generate N×N blocks, and each of the N×N blocks may be partitioned through quad tree structure partitioning to generate N/2×N/2 square transform units TU1, TU2, TU3, and TU4.

With respect to the blocks (for example, coding units (CUs), prediction units (PUs), and transform units (TUs)) resulting from the partitioning method described with reference to FIGS. 16 through 20, image encoding and decoding may be performed using the methods that have been described with reference to FIGS. 7 through 14.

Herein below, an embodiment of a method in which the encoding apparatus 700 determines a block partitioning structure will be described.

The picture partitioning unit 110 in the image encoding apparatus 700 may determine dividable coding units (CUs), prediction unit PUs, and transform units TUs by performing the rate distortion optimization (RDO) according to a preset order.

For example, in order to determine the block partition structure, the picture partitioning unit 710 may determine the optimum block partition structure in terms of bit rate and distortion by performing rate distortion optimization-quantization (RDO-Q).

Figure 21:
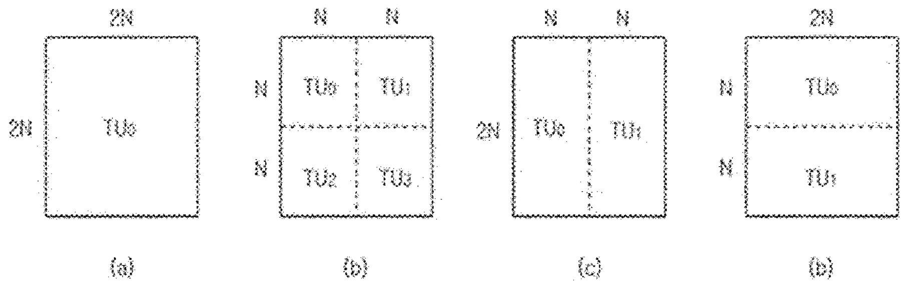
FIGS. 21 and 22 are diagrams illustrating a method of determining a partitioned structure of a transform unit by performing rate distortion optimization (RDO)

Referring to FIG. 21, when the coding unit CU has a 2N×2N-pixel size, by performing the RDO in order of (a) a 2N×2N-pixel size, (b) an N×N-pixel size, (c) an N×2N-pixel size, and (d) a 2N×N-pixel size, it is possible to determine the optimum partition structure of the transform unit TU.

Figure 22:
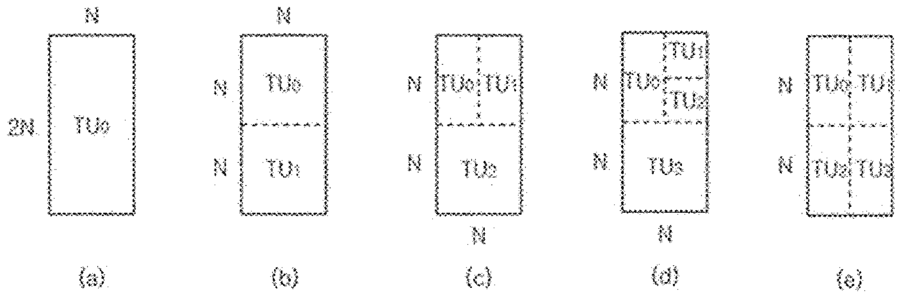

Referring to FIG. 22, when a coding unit CU has an N×2N-pixel size or a 2N×N-pixel size, by performing the RDO in order of (a) an N×2N-pixel size (or a 2N×N-pixel size), (b) an N×N-pixelsize, (c) an N/2×N-(or N×N/2)-pixel size and an N×N-pixel size, (d) an N/2×N/2-pixel size, an N/2×N-pixel size, and an N×N-pixel size, and (e) an N/2×N-pixel size, it is possible to determine the optimum partition structure of the transform unit TU.

Herein above, although a block partitioning method according to the present invention has been described with reference to an example in which the rate distortion optimization (RDO) is performed to determine a block partition structure, the picture partitioning unit 710 may determine a block partition structure using sum of an absolute difference (DAD) algorithm or a mean square error (MSE) algorithm, thereby providing a good compromise between the improved efficiency and the reduction of the complexity.

Herein below, an image processing method according to one embodiment of the present invention and an image encoding and decoding method using the image processing method will be described in greater detail.

Figure 23:
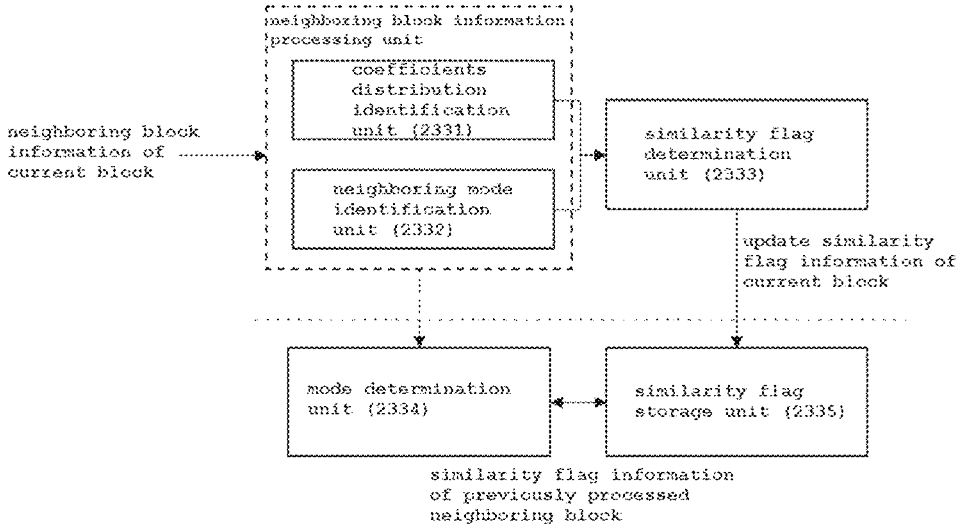
FIG. 23 is a block diagram illustrating a configuration of an intra prediction unit for determining an intra prediction mode, according to one embodiment of the present disclosure.

FIG. 23 is a block diagram used to describe a configuration for determining an intra prediction mode of an intra prediction unit according to one embodiment of the present disclosure.

Referring to FIG. 23, the intra prediction unit 1330 according to one embodiment of the present invention includes a neighboring block information processing unit including a coefficient distribution identification unit 2331 and a neighboring mode identification unit 2332, a similarity flag determination unit 2333, a similarity flag storage unit 2335, and a mode determination unit 2334.

The intra prediction unit 1330 may determine an intra prediction mode of the current block. For example, the mode determination unit 2334 may perform restriction processing or direction adaptive processing on the intra mode corresponding to the current block on the basis of the information on the previously decoded neighboring blocks located in the vicinity of the current block. The neighboring block information processing unit may obtain information on the previously decoded neighboring blocks located in the vicinity of the current block to be intra predictively decoded. The mode determination unit 2334 may parse the bitstream using the neighboring block information processing unit to obtain the information. In addition, the mode determination unit 2334 may obtain the similarity flag information from the similarity flag storage unit 2335 when there is similarity flag information of the previously processed neighboring blocks. The mode determination unit 2334 may perform restriction processing or direction adaptive processing on candidate modes corresponding to the current block using the obtained similarity flag information. Here, the restriction processing may mean that only predetermined intra prediction modes are allowed or that predetermined intra prediction modes are not allowed. For example, on the basis of information on neighboring blocks and/or similarity flag information of the neighboring blocks, only predetermined intra prediction modes corresponding to the current block may be allowed. Here, the direction adaptive processing may mean performing processing based on information on a predetermined direction. For example, an intra prediction mode corresponding to the current block may be determined based on the predetermined direction information obtained from the information on the neighboring blocks and/or the similarity flag information of the neighboring blocks.

In addition, the intra prediction unit 1330 may determine a similarity flag IS_SIMILAR_FLAG corresponding to the current block from the information on the neighboring blocks by using the information determined by the similarity flag determination unit 2333. The determined similarity flag is stored and updated in the similarity flag storage unit 2335 in association with the current flag, and used to determine a mode of the next block.

Here, the information on the neighboring blocks may include at least one of the inverse transform coefficients distribution information, pixel value change information, pixel value information, and pixel difference value information. For example, the pixel value change information can be calculated using the scatter of adjacent pixels included in the neighboring blocks, and examples of the measures of the scatter include statistics indexes such as variance, standard deviation, average deviation, and quartile deviation.

The neighboring block information processing unit may include the coefficient distribution identification unit 2331 and the neighboring mode identification unit 2332. The neighboring block information processing unit may provide information to determine a mode or a similarity flag of the current block.

The similarity flag determination unit 2333 may acquire inverse transform coefficients distribution information identified by the coefficients distribution identification unit 2331. In addition, the similarity flag determination unit 2330 may acquire intra mode information of the neighboring blocks identified by the neighboring mode identification unit 2332. The similarity flag determination unit 2333 may determine the similarity flags by using the acquired inverse transform coefficients distribution information and/or the intra mode information of the neighboring blocks. Here, the similarity flags may include a horizontal similarity flag or a vertical similarity flag.

The horizontal similarity flag indicates that the pixels in the previously decoded neighboring blocks have a vertical directionality. Having a vertical directionality means having similarity to the left block horizontally adjacent to the current block. For example, the horizontal similarity flag indicates that a previously decoded left block horizontally adjacent to the current block has a vertical directionality which means having similarity to the current block. Therefore, this horizontal similarity flag may be represented by a left similarity flag IS-SIMILAR_LEFT.

The vertical similarity flag indicates that a previously decoded neighboring block has a horizontal directionality. Having a horizontal directionality means having similarity to the above block vertically adjacent to the current block.

For example, the vertical similarity flag indicates that a previously decoded above block vertically adjacent to the current block has a vertical similarity to the current block. This vertical similarity flag may be represented by an upper similarity flag IS_SIMILAR_UP.

The horizontal similarity flag or the vertical similarity flag will be calculated from neighboring blocks and will be stored in the similarity flag storage unit 2335. On the other hand, the decoding apparatus 1300 may continuously update the similarity flag information to respond to changes in neighboring blocks. This can be processed without additional signaling information.

The similarity flag determination unit 2333 may acquire information on neighboring blocks, for example, inverse transform coefficients distribution information from the coefficients distribution identification unit 2331. The similarity flag determination unit 2333 may determine the horizontal directionality or the vertical directionality of the neighboring block on the basis of the neighboring block information. The similarity flag determination unit 2333 can more accurately determine the directionality using the coefficients distribution information and/or the intra mode information of the neighboring block. In addition, the similarity flag may be determined using the determined directionality.

The mode determination unit 2334 may perform restriction processing or direction adaptive processing on the intra mode determination on the basis of the similarity flag information of the previously processed neighboring block.

Here, the restriction processing may mean permitting only predetermined intra prediction modes or not permitting predetermined intra prediction modes. For example, allowable intra prediction modes for the current block can be restrictively processed according to the similarity flag information. Alternatively, prediction mode candidates in an MPM candidate mode list can be restrictively processed. More particularly, as the allowable intra prediction modes for the current block, only predetermined intra prediction modes may be allowed on the basis of information acquired from at least one of the coefficients distributions of the inversely transformed blocks, the intra prediction modes of the neighboring blocks, the size of the current block, and the shape of the current block. Alternatively, when generating the MPM candidate mode list, only predetermined intra prediction mode candidates may be allowed on the basis of information acquired from at least one of the coefficients distributions of the inversely transformed blocks, the intra prediction modes of the neighboring blocks, the size of the current block, and the shape of the current block.

Here, the direction adaptive processing may mean performing the corresponding process based on the predetermined direction information. For example, allowable intra prediction modes of the current block may be restrictively processed according to the similarity flag information. Alternatively, prediction mode candidates in an MPM candidate mode list can be direction-adaptively processed. More particularly, the allowable intra prediction modes of the current block may be determined based on predetermined direction information acquired from at least one of the coefficients distributions of the inversely transformed blocks, the intra prediction modes of the neighboring blocks, the size of the current block, and the shape of the current block. Alternatively, when generating the MPM candidate mode list, MPM candidates may be determined on the basis of predetermined direction information acquired from at least one of the coefficients distributions of the inversely transformed block, the intra prediction modes of the neighboring blocks, the size of the current block, and the shape of the current block.

On the other hand, when determining a similarity flag, the coefficients distribution identification unit 2331 may obtain and use only the transform coefficient information by parsing the bitstream. The coefficients distribution identification unit 2331 may not use pixel information of the previously predictively decoded block or the reconstructed residual signal. Therefore, the restriction processing or direction adaptive processing can eliminate parsing dependency.

The mode determination unit 2334 may perform the restriction processing without additional signaling information transmitted from the encoding apparatus 700. Therefore, it is possible to reduce additional signaling information on prediction mode candidates having unnecessary directionality and to increase compression efficiency without causing inter-process parsing dependency in decoding.

However, one embodiment of the present invention does not exclude a case where similarity flag information corresponding to the neighboring blocks is signaled. The determination of the similarity flag information and the storing process may be performed in the same manner as in the encoding apparatus 700 as necessary. That is, the encoding apparatus 700 may generate a similarity flag on the basis of the neighboring block information and determine the intra mode in a direction adaptive manner, using the generated similarity flag. In this case, the generated similarity flag information is included in the bitstream and is thus transmitted to the decoding apparatus 1300 as the bitstream. The mode determination unit 2334 may determine the mode of the current block using the signaled similarity flag information of the neighboring blocks even without separately obtaining information on the neighboring blocks or without processing the information on the neighboring blocks. Therefore, in this case, it is possible to reduce the computation complexity and improve the performance of the decoding apparatus.

In particular, the direction adaptive processing according to one embodiment of the present invention may reduce the number of intra prediction modes within an angle with respect a specific direction that is not indicated by the similarity flag, to simplify the processing. In addition, the direction adaptive processing may increase the number of intra prediction modes within an angle by more finely segmenting the angle with respect to the direction indicated by the similarity flag. Namely, although the total number of intra prediction mode candidates does not change, a more precise and accurate prediction mode can be determined.

For example, when the intra mode of the neighboring block is a horizontal direction mode, since there is a high likelihood that the optimum prediction mode of the current block is similar to the horizontal direction mode, a relatively larger number of directional modes may be allocated for the horizontal direction. On the other hand, in this case, a relatively small number of direction modes are allocated for the vertical direction.

Figure 24:
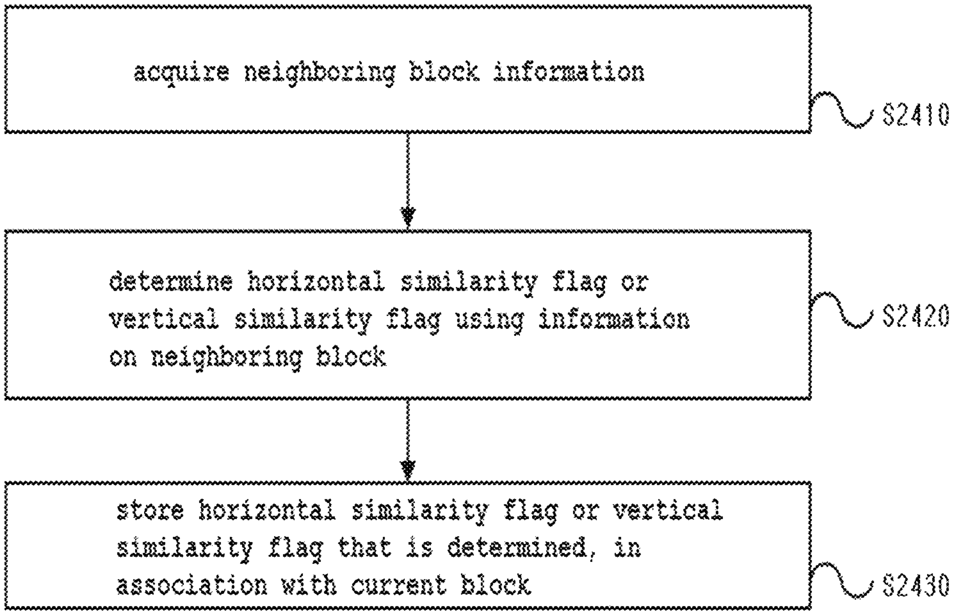
FIGS. 24 and 25 are flowcharts illustrating a method of performing an intra prediction decoding process using a direction adaptive intra prediction mode according to one embodiment of the present disclosure.
Figure 25:
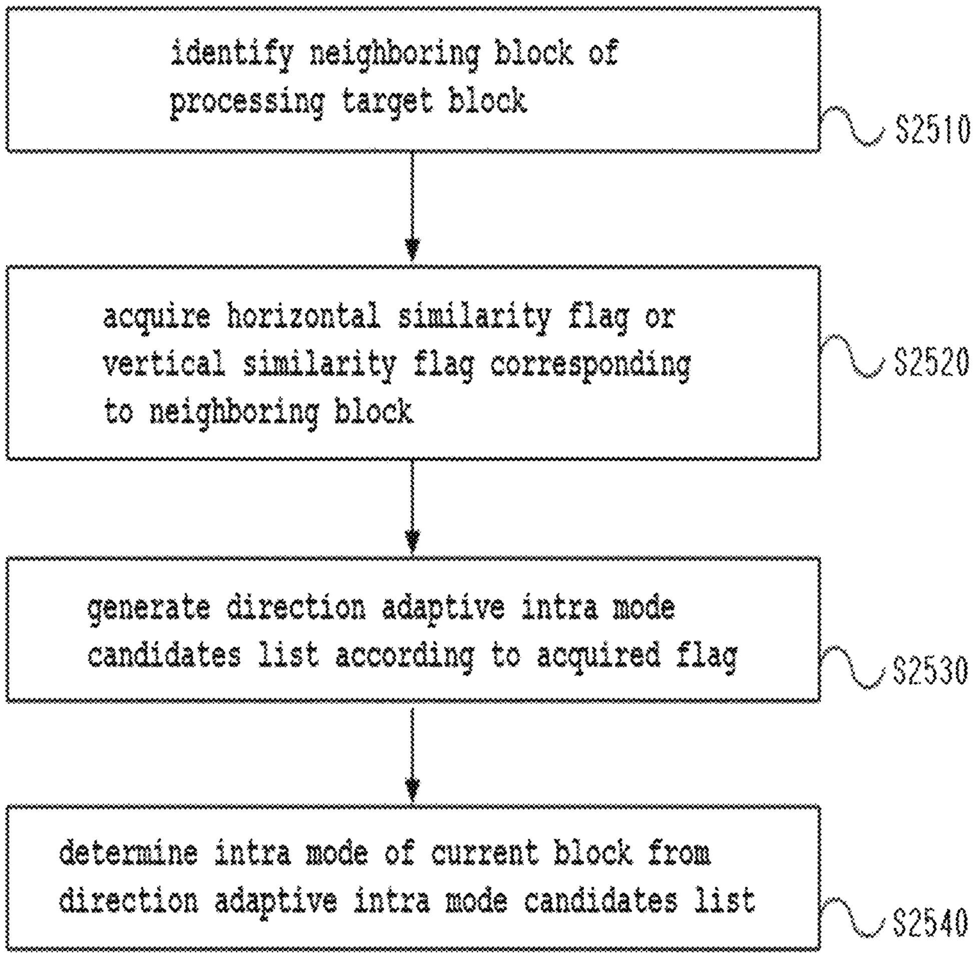

FIGS. 24 and 25 are flowcharts illustrating a method of performing an intra prediction decoding process using a direction adaptive intra prediction mode according to one embodiment of the present disclosure.

Figure 26:
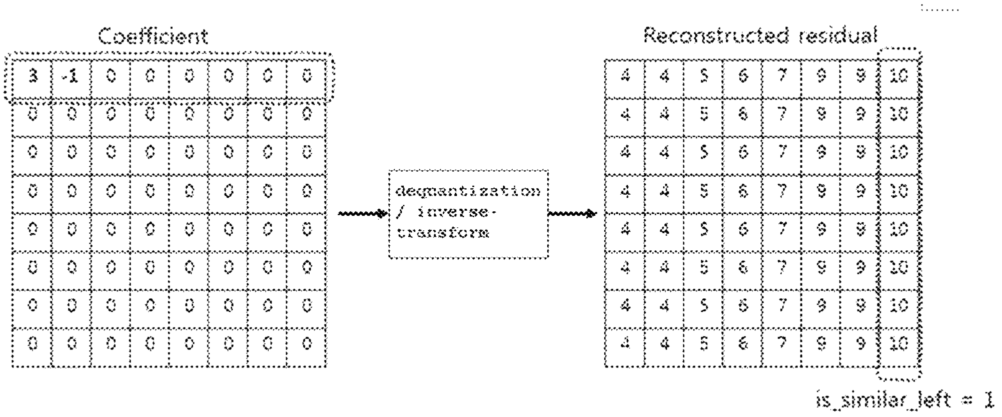
FIGS. 26 and 27 are flowcharts illustrating horizontal similarity flags and vertical similarity flags used to direction adaptive intra modes, according to one embodiment of the present disclosure.
Figure 27:
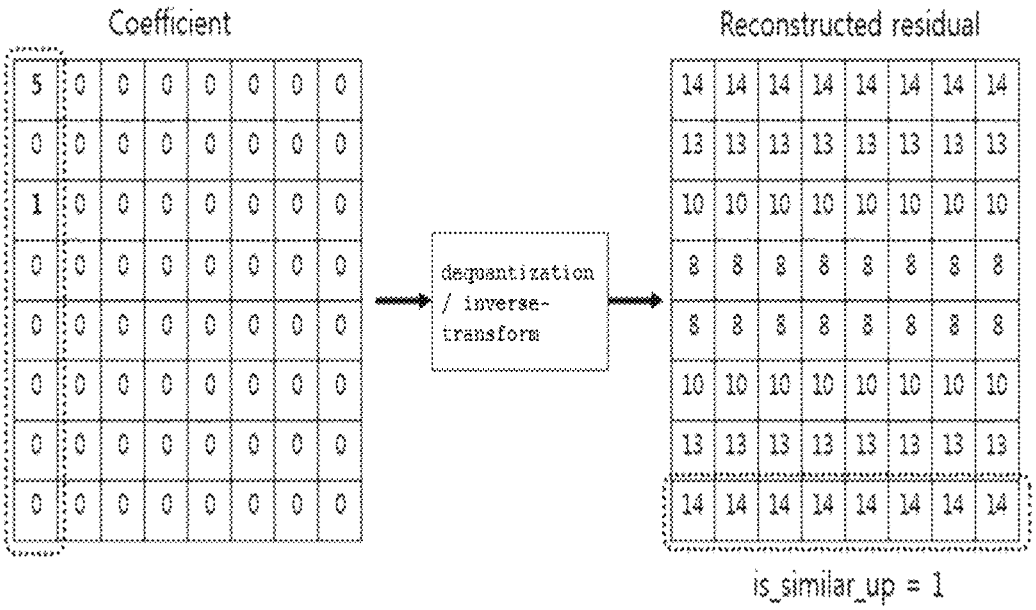

FIGS. 26 and 27 are flowcharts illustrating horizontal similarity flags and vertical similarity flags determined to obtain a directional adaptive intra mode according to one embodiment of the present disclosure.

Referring to FIG. 24, the decoding apparatus 1300 may acquire information on neighboring blocks (S2410).

For example, the decoding apparatus 1300 may acquire coefficients distribution information and/or intra modes information using the coefficients distribution identification unit 2331 and/or the neighboring mode identification unit 2332.

The similarity flag determination unit 2333 may determine the horizontal similarity flag or the vertical similarity flag by using the information on the neighboring blocks, for example, the transform coefficients distribution information and/or the intra mode information (S2420). In addition, the horizontal similarity flag or the vertical similarity flag determined in Step S2420 may be stored in the similarity flag storage unit 2335 (S2430).

Here, as illustrated in FIGS. 26 and 27, the horizontal similarity flag and/or the vertical similarity flag may be determined based on the information on the neighboring blocks. For example, they may be determined from the transform coefficients information of the neighboring blocks. In particular, the information on the neighboring blocks may be transform coefficients distribution information. The similarity flag may be used to determine the intra mode of the block.

Particularly, the similarity flag determination unit 2333 may determine whether the distribution of residual values of respective pixels to be inversely transformed has a vertical directionality or a horizontal directionality, using the coefficients distribution information and/or the intra mode information of the neighboring blocks.

More particularly, referring to FIGS. 26 and 27, the similarity flag determination unit 2333 may determine whether the reconstructed pixels at the lowermost row or the rightmost column in a reconstructed block have similar values according to a directionality, on the basis of the coefficients distribution information in transform domain which is acquired from the coefficients distribution identification unit 2331 and the intra mode information of the neighboring blocks. For example, the aforementioned determination can be performed in the parsing step.

Here, the above coefficients distribution information may be differently classified according to a transform kemel. The similarity flag determination unit 2333 may perform directional mapping corresponding to at least one of the coefficient distributions classified according to the transform kernel and the intra mode, according to a preset mapping table.

For example, as illustrated in FIG. 26, when the DCT transform coefficients exist only in the first line or are all zeros, it can be confirmed that the reconstructed residuals located at the rightmost column have the same value.

Thus, the similarity flag determination unit 2333 may determine whether the DCT coefficients exist only in the first row of the neighboring block or are all zeros. After determined, the similarity flag determination unit 2333 may determine whether the intra mode of the neighboring block is DC mode or a vertical direction mode.

As described above, when the DCT transformation coefficients exist only in the first row of the neighboring block or are all zeros and when the intra mode is DC mode or a vertical direction mode, the rightmost reconstruction pixels to be reconstructed may be assumed to have the same value. Thus, when the DCT transform coefficients of the neighboring block exist only in the first row of the neighboring block or are all zeros and when the intra mode is DC mode or a vertical direction mode, the similarity flag determination unit 2333 may determine that the reconstructed residual signals of the neighboring block have verticality. The similarity flag determination unit 2333 sets the horizontal similarity flag IS_SIMILAR_LEFT with respect to the current block to a value of 1. On the other hand, when the above conditions are not met, the horizontal similarity flag IS_SIMILAR_LEFT may be set to a value of 0.

On the other hand, referring to FIG. 27, when the DCT transform coefficients exist only in the first column or are all zeros, it is confirmed that the reconstructed residuals located at the lowermost row have the same value.

Thus, when the DCT transform coefficients exist only in the first column in the neighboring block or are all zeros, and when the intra mode is DC mode or a horizontal direction mode, the similarity flag determination unit 2333 determines that the reconstructed residual signals in the neighboring block have horizontality. The similarity flag determination unit 2333 may set the vertical similarity flag IS_SIMILAR_UP with respect to the current block to a value of 1. On the other hand, when the above conditions are not met, the vertical similarity flag IS_SIMILAR_UP may be set to a value of 0.

Therefore, the horizontal similarity flag may indicate whether the left pixels of the current block are similar and the vertical similarity flag may indicate whether the upper pixels of the current block are similar.

In addition, the directionality of the current block can be indicated by using one of the horizontal similarity flag and the vertical similarity flag. For example, when the DCT transform coefficients of the neighboring block exist only in the first row of the neighboring block or are all zeros and when the intra mode is DC mode or a vertical direction mode, the similarity flag determination unit 2333 determines that the reconstructed residual signals in the neighboring block have verticality. The horizontal similarity flag with respect to the current block may be determined as having a value of 1 according to the determination. When the DCT transform coefficients are present only in the first column of the neighboring block or are all zeros and when the intra mode is DC mode or a horizontal direction mode, the similarity flag determination unit 2333 determines that the reconstructed residual signals of the neighboring block have horizontality. Then, based on the determination, the horizontal similarity flag with respect to the current block can be determined as having a value of 0.

As described above, the coefficients distribution identification unit 2331 parses the bitstream to identify the coefficients distribution, the neighboring mode identification unit 2332 identifies the intra mode of the neighboring block, and the mode determination unit 2334 determines the intra mode of the current block. The decoding apparatus 1300 may preliminarily process this through a parsing process. For example, when the scanning direction of the transform coefficients is determined according to the intra mode, the intra mode determination process according to one embodiment of the present invention can be processed in the parsing process.

The operation of the similarity flag determination unit 2333 is described with reference to a DCT transform. When a different transform method from DCT is used, the similarity flag determination unit 2333 may use the characteristic information of the different transform. For example, the similarity flag determination unit 2333 may identify coefficients distribution information corresponding to the characteristic information, and may determine a horizontal similarity flag or a vertical similarity flag according to the coefficients distribution information. The horizontal or vertical similarity flag may be determined according to whether the reconstructed pixels in the bottom row or the right column in the reconstructed block have similar values within a predetermined range. In addition, in the above embodiment, the directionality of the lowermost or rightmost reconstructed pixels in the reconstructed block is predicted, but is not limited thereto. The directionality of the reconstructed pixels at any position in the reconstructed block may be predicted by DCT or another transform method.

Although the embodiment of the present invention presents an example in which the similarity flag determination unit 2333 uses both the coefficients distribution information and the intra mode information, but it is also possible to use only one of them.

On the other hand, when the similarity flag determination unit 2333 determines the horizontal or vertical similarity flag, the flag may be stored as an internal variable in the parsing process. The flag may be used to determine the intra mode of the next block or the lower block. Thus, the similarity flag is not included in a bitstream to be transmitted for signaling, but may be processed and/or generated in the decoding apparatus 1300. However, as described above, depending on the efficiency, the similarity flag processed by the encoding apparatus 700 may be signaled to the decoding apparatus 1300.

Referring to FIG. 25, when there is a neighboring block for which the similarity flag has been determined, the neighboring block of the current block can be identified (S2510).

In addition, the horizontal similarity flag or the vertical similarity flag corresponding to the neighboring block can be acquired from the similarity flag determination unit 2333 (S2520). The horizontal similarity flag or the vertical similarity flag may be preliminarily determined.

In addition, depending on the acquired flag, a direction adaptive intra prediction mode candidates list may be generated (S2530). For example, it is possible to create a restricted intra mode candidates list according to the acquired flag.

Then, the intra mode of the current block may be selected from the direction adaptive intra mode candidates list (S2540). For example, the intra mode of the current block can be selected from the restricted intra mode candidates list.

FIGS. 28 through 31 are diagrams illustrating direction adaptive intra modes for some cases according to one embodiment of the present disclosure.

The intra prediction unit 1330 according to one embodiment of the present invention may adaptively determine allowable intra prediction modes of the current block, based on a similarity flag determined from at least one of the coefficients distributions of the inversely transformed blocks, the intra prediction modes of the neighboring blocks, the size of the current block, and the shape of the current block. For example, the number of allowable intra prediction modes of the current block may be increased or reduced, based on direction information of a similarity flag determined from at least one of the coefficients distributions of the inversely transformed blocks, the intra prediction modes of the neighboring blocks, the size of the current block, and the shape of the current block.

In addition, the intra prediction unit 1330 may determine prediction mode candidates of an MPM candidate mode list of the current block, based on a similarity flag determined from at least one of the coefficients distributions of the inversely transformed blocks, the intra prediction modes of the neighboring blocks, the size of the current block, and the shape of the current block. For example, the number of prediction mode candidates of the MPM candidate mode list of the current block may be increased or reduced, based on direction information of a similarity flag determined from at least one of the coefficients distributions of the inversely transformed blocks, the intra prediction modes of the neighboring blocks, the size of the current block, and the shape of the current block.

For example, when the left neighboring pixels and the pixels in the current block are similar, the number of intra mode candidates for the horizontal direction may be reduced to simplify the intra mode candidates in the horizontal direction or the leftward direction. In addition, to subdivide (i.e., more finely segment) the intra mode candidate directions for the upward direction or the vertical direction, the number of intra mode candidates for the vertical direction may be increased. In this case, any mode in the horizontal direction yields almost the same prediction. Thus, the mode subdivision (i.e., finer segmentation) for the vertical direction enables a more finely tuned intra mode prediction in the vertical direction, thereby improving the prediction accuracy and the picture quality. Here, subdividing (i.e., more finely segmenting) the intra mode candidate directions means increasing the number of intra prediction modes in a predetermined direction.

When each of the above neighboring pixels of the current block are similar to the pixels in the current block, the number of intra mode candidates for the vertical direction may be reduced to simplify intra mode candidates in the vertical direction or in the upward direction. In contrast, the number of intra mode candidates for a horizontal direction may be increased to subdivide (i.e., more finely segment) the intra mode candidate directions in the horizontal direction. In this case, any mode in the vertical direction yields almost the same prediction. Thus, the mode subdivision (finer segmentation) for the horizontal direction enables a more finely tuned intra mode prediction in the horizontal direction, thereby improving the prediction accuracy and the picture quality.

Thus, a list including an increased number of intra prediction mode candidates in one direction (i.e., a horizontal direction or a vertical direction) and a reduced number of intra prediction mode candidates in the other direction can be constructed.

For example, the intra prediction unit 1330 may reduce the number of intra modes corresponding to a predetermined threshold or greater in the horizontal direction, based on the horizontal similarity flag. On the other hand, in contrast to the above reduction, the intra modes corresponding to a predetermined threshold or greater are subdivided and an increased number of intra modes can be allocated. The predetermined threshold may be represented by a mode number, a mode value, a mode numeral, a mode angle, a mode direction, or one or more combinations thereof. However, the predetermined threshold may not be limited thereto and it may be any condition that can be used to increase or reduce intra modes for the vertical direction.

For example, the intra prediction unit 1330 may reduce the number of intra modes corresponding to a predetermined threshold or greater in the vertical direction, based on the vertical similarity flag. On the other hand, in contrast to the above reduction, the intra modes corresponding to a predetermined threshold or greater in the horizontal direction may be subdivided and an increased number of intra modes may be allocated for the horizontal direction.

That is, the total number of directional modes are maintained while intra prediction processing with finer precision is possible for a specific necessary direction.

When reducing or increasing the number of intra modes, the reduction or increasing may be adaptively processed based on at least one of the intra prediction mode of the current block, the size of the current block, and the shape of the current block. For example, when the current block is a 2N×N block, at least one intra prediction mode having a value that is outside the predetermined threshold, among horizontal modes, can be reduced. In this case, in place of the reduced horizontal intra prediction modes, at least one vertical intra prediction mode may be added. Similarly, when the current block is an N×2N block, at least one intra prediction mode having a value that is outside the predetermined threshold may be reduced from vertical direction modes. In this case, in place of the reduced vertical intra prediction modes, at least one horizontal intra prediction mode may be added. In other words, the number of intra prediction modes for the horizontal direction may differ from the number of intra prediction modes for the vertical direction, depending on the size and/or shape of the current block. In addition, the number of eliminated intra prediction modes may differ from the number of added intra prediction modes.

The predetermined threshold may be represented in a mode number, a mode value, a mode numeral, a mode angle, a mode direction, or one or more combinations thereof.

The eliminated intra prediction modes and/or the additionally allocated intra prediction modes instead of the eliminated intra prediction modes may vary depending on the size and/or shape of the current block. For example, they may vary depending to a ratio of the width and height of the current block or the size and/or direction of the diagonal component. The reduced intra prediction modes may be modes using reference pixels disposed outside an area of the size (N×(the width and height of the current block). Here, N is a positive integer greater than zero, for example, N may be 2. A method of reducing the number of intra prediction modes and/or increasing the number of intra prediction modes may be performed by shifting the intra prediction mode numbers. For example, a predetermined offset may be applied to the intra prediction mode numbers.

As an example of the present disclosure, when the left neighboring pixels are similar to the pixels in the current block, the number of intra mode candidates in the horizontal direction or the leftward direction may be restricted. In this case, any mode in the horizontal direction yields almost the same prediction result. Therefore, the restriction processing reduces the complexity and amount of computations. In addition, the number of bits allocated for intra modes can be reduced. Therefore, compression efficiency can be improved.

When the above neighboring pixels and the pixels in the current block are similar, the number of intra mode candidates in the vertical direction or in the upward direction may be restricted. In this case, any mode in the vertical direction yields almost the same prediction result. Therefore, the restriction processing reduces the complexity and amount of the computations and reduces the number of bits allocated for intra modes, thereby increasing compression efficiency.

Thus, a list including an increased number of intra prediction mode candidates in one direction (i.e., a horizontal direction or a vertical direction) determined according to a similarity flag and a reduced number of intra prediction mode candidates in the other direction can be constructed.

Thus, a list including restricted intra prediction mode candidates in one direction among a horizontal direction and a vertical direction selected according to a similarity flag can be constructed. For example, the intra prediction unit 1330 may restrict intra modes for the horizontal direction such that only specific orientations remain, by eliminating all the horizontal intra modes corresponding to a predetermined threshold or greater.

For example, the intra prediction unit 1330 may restrict intra modes for the vertical direction such that only specific orientations remain, by eliminating all the vertical intra modes corresponding a predetermined threshold or greater.

Figure 28:
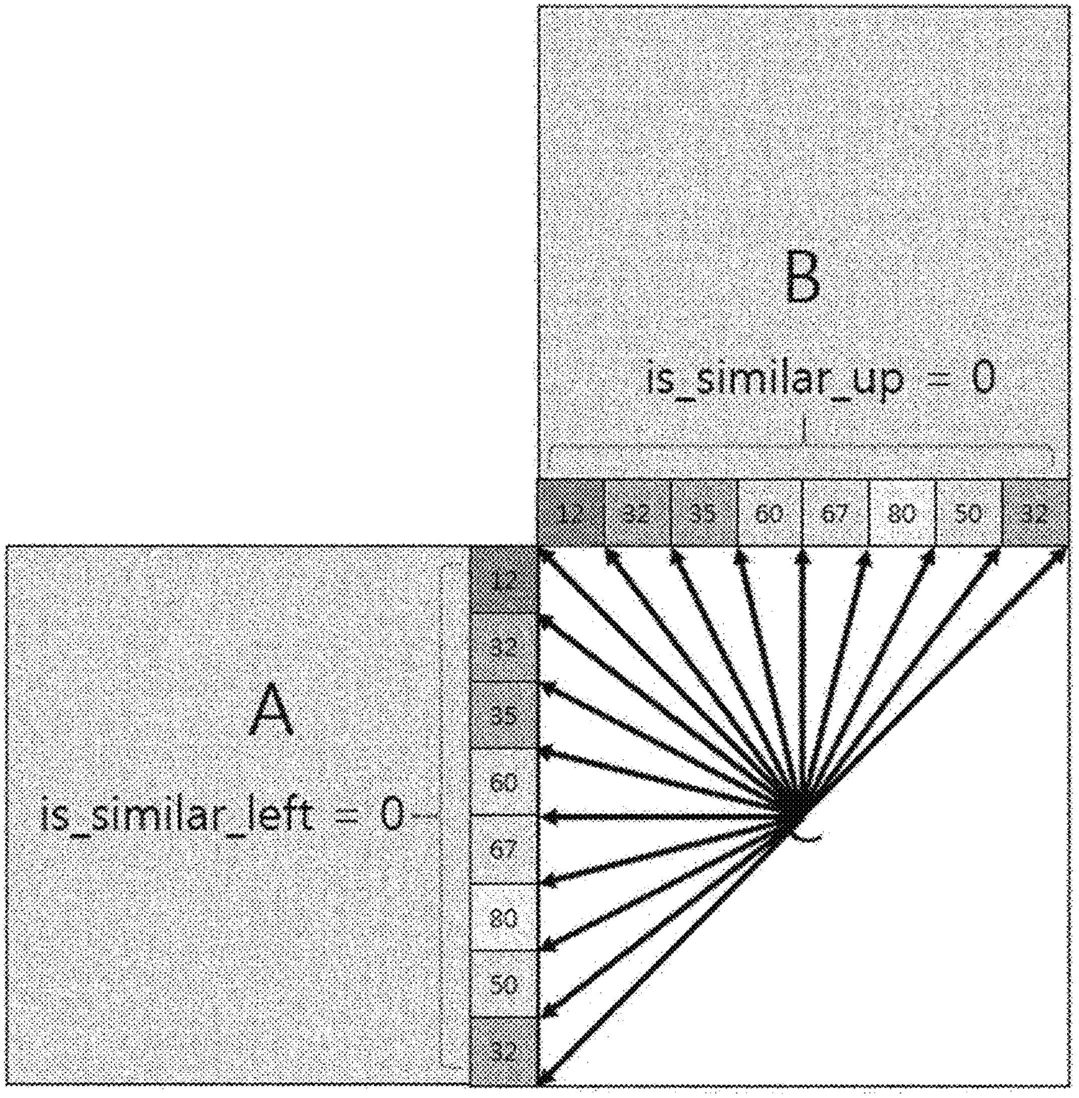
FIGS. 28 through 31 are views illustrating direction adaptive intra modes for some cases according to one embodiment of the present disclosure.

FIG. 28 illustrates a case where all the horizontal or vertical similarity flags are zeros, in which the intra modes are determined or an MPM candidate list is constructed without performing restriction processing or without direction adaptive processing.

Figure 29:
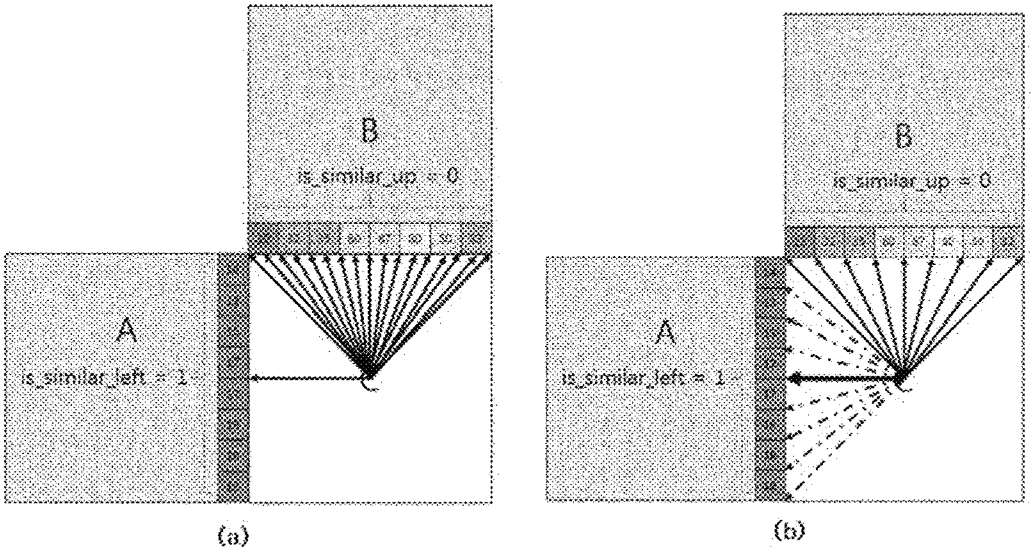

FIG. 29 illustrates a case where the horizontal similarity flag has a value of 1 and the vertical similarity flag has a value of 0. In the case of (a) of FIG. 29, intra modes finely segmented in the vertical direction are included in a determination targets list or an MPM candidates list, instead of intra modes having a horizontal component of a predetermined threshold or greater. In addition, for example, in the case of (b) of FIG. 29, intra modes containing a horizontal component of a predetermined threshold or greater may be preliminarily eliminated not to be included in the determination targets list or the MPM candidates list.

Figure 30:
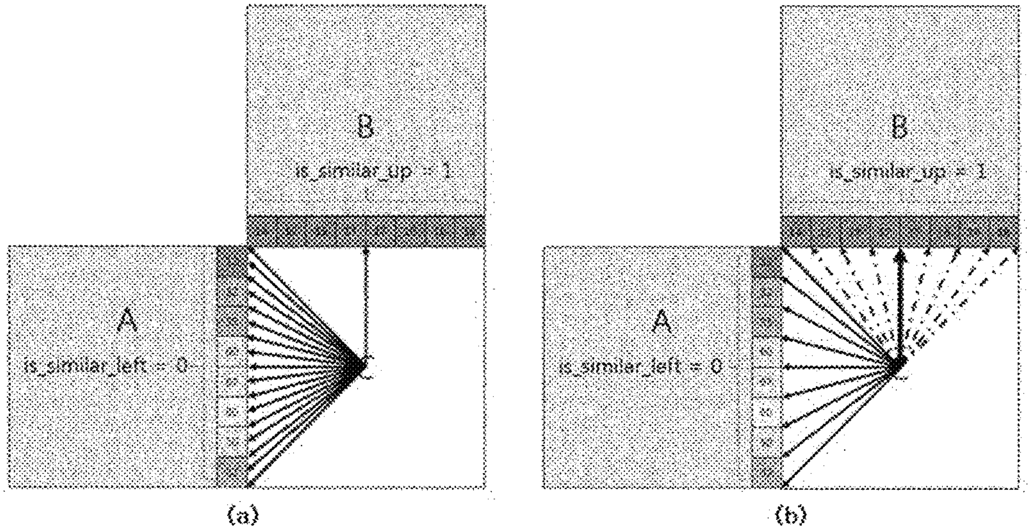

FIG. 30 illustrates a case where the horizontal similarity flag has a value of 0 and the vertical similarity flag has a value of 1. In the case of (a) of FIG. 30, intra modes finely segmented in the horizontal direction are included in a determination targets list or an MPM candidates list, instead of intra modes having a vertical component of a predetermined threshold or greater. In addition, for example, in the case of (b) of FIG. 30, intra modes containing a vertical component of a predetermined threshold or greater may be preliminarily eliminated not to be included in the determination targets list or the MPM candidates list.

Figure 31:
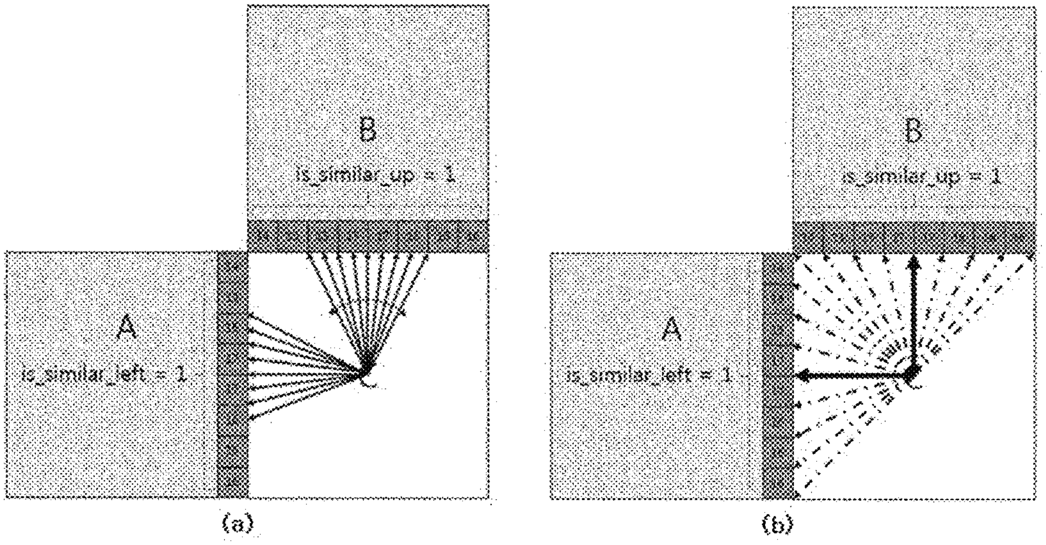

FIG. 31 illustrates a case where the horizontal similarity flag has a value of 1 and the vertical similarity flag has a value of 1. In the case of (a) of FIG. 31, intra modes densely concentrated in the vertical direction and the horizontal direction may be more finely segmented and the resulting increased intra modes may be included in a determination targets list or an MPM candidates list. In addition, for example, in the case of (b) of FIG. 31, all the directional intra modes except for the vertical mode and the horizontal mode are excluded from the determination targets list or the MPM candidates list.

Accordingly, it is possible to reduce the amount of computations for deriving the intra modes in the decoding apparatus 1300, and may also reduce the number of bits allocated for intra modes.

On the other hand, the number of modes to be eliminated or added for the vertical or horizontal direction is presented only for illustrative purposes, and the number of intra modes for each direction may be determined differently depending on the total number of intra modes. However, depending on the similarity flag, the number of intra modes may be direction-adaptively increased or reduced in a specific direction.

Further, according to the embodiment of the present invention, the intra prediction unit 1330 may determine an intra mode angle range of the current block according to neighboring block information. In addition, the intra prediction unit 1330 may construct an intra mode candidates list using only intra modes included within the angle range. For example, the intra prediction unit 1330 may determine an angle range table using directionality information derived from the neighboring blocks. In addition, the intra prediction unit 1330 may direction-adaptively determine the intra modes on the basis of the angle range table.

Also, the number of intra modes included within the angle range may be the same or may be decreased compared to the number of intra modes set before the direction adaptive processing is performed. When it is the same, intra modes corresponding to the intra mode identification information may be more finely segmented at an equal angular interval. In this case, the image quality is improved.

On the other hand, when the number of intra modes within the angle range is reduced compared to the number set before the direction adaptive processing is performed, the intra modes outside the angle range may be excluded, resulting in slight deterioration in the image quality and increases in the amount of computations and transmission efficiency. In this case, the coding efficiency can be significantly improved.

Thus, the intra prediction unit 1330 may select a segmentation mode in which intra modes within a specific direction angle range are more finely segmented or an exclusion mode in which intra modes outside the angle range are excluded. In this case, a process of improving both the image quality and the coding efficiency may be additionally performed.

Figure 32:
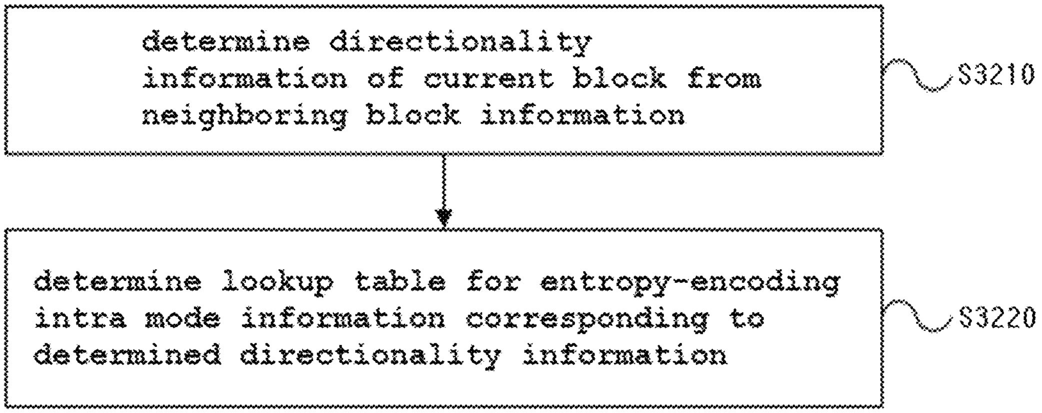
Figure 33:
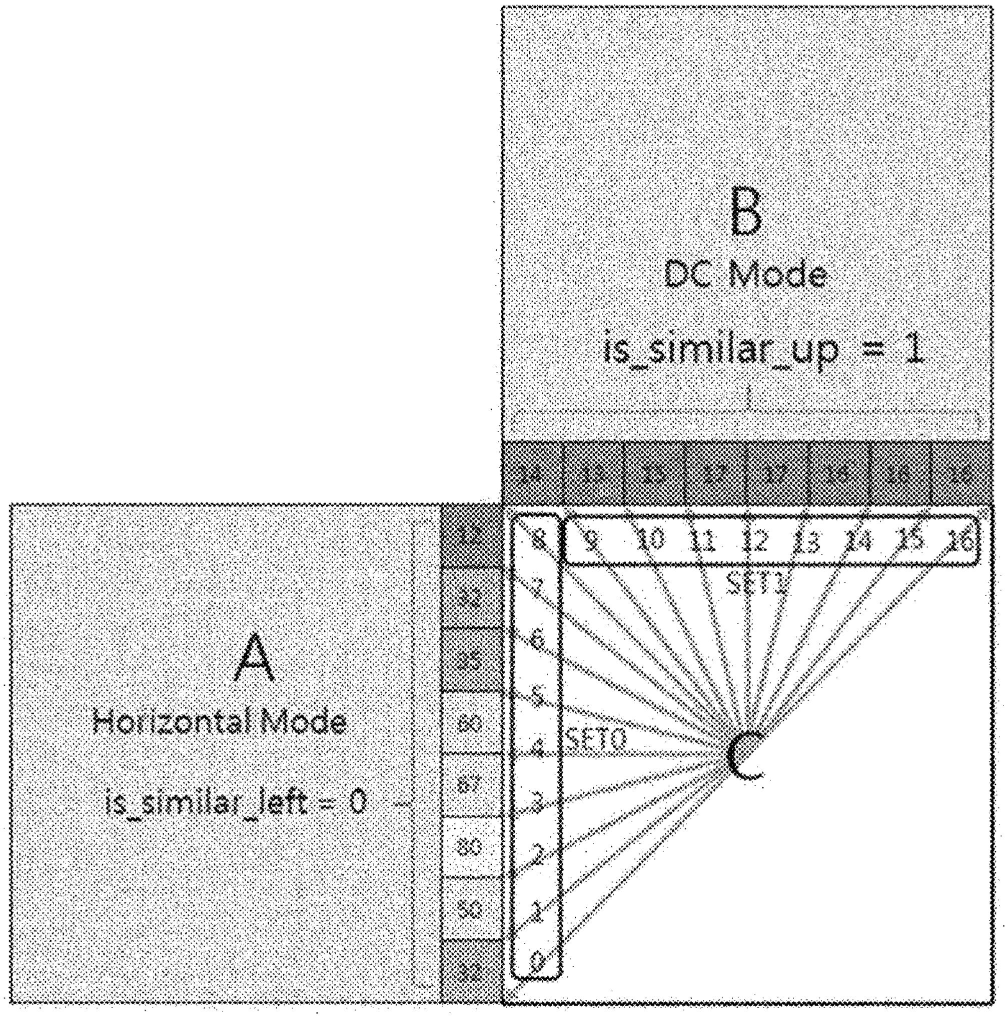

FIGS. 32 through 34 are diagrams illustrating a method of increasing entropy coding efficiency using neighboring block information according to one embodiment of the present disclosure.

FIG. 32 is a flowchart illustrating an image processing method according to one embodiment of the present invention.

The entropy encoding unit 740 (or entropy decoding unit 1310) may entropy-encode or entropy-decode the intra mode information of the current block by using the directionality information of the neighboring blocks. The directionality information of the neighboring blocks may be obtained from the neighboring block information processing unit. For example, the directionality information may be obtained from the coefficients distribution identification unit 2331 and/or the neighboring mode identification unit 2332 and may include the above-described similarity flag information.

Referring to FIG. 32, the directionality of the current block may be determined from the neighboring block information (S3210). On the basis of the directionality determined in Step S3210, a lookup table for entropy-encoding intra mode information may be determined (S3220).

For example, when the horizontal similarity flag and/or when the vertical similarity flag is determined or when the decoded intra mode information is obtained, the entropy encoding unit 740 may determine an entropy encoding lookup table corresponding to the determined horizontal similarity flag and/or the vertical similarity flag or corresponding to the intra mode information of the neighboring block.

The directionality information of the neighboring blocks may be obtained from the information on the previously decoded neighboring blocks. Here, the directionality information may include the horizontal directionality information and/or the vertical directionality information. Further, the entropy encoding lookup table corresponding to information on a specific directionality (i.e., specific directionality information) may be determined.

The entropy encoding lookup tables may include a coding table in which intra modes have respectively different variable-length codes, depending on specific directionality information. For example, a shorter variable-length code may be allocated for intra modes corresponding to or not corresponding to specific directionality information than the other intra modes. Accordingly, entropy encoding and decoding that applies a higher probability to a specific directionality can be performed, resulting in improvement in entropy coding efficiency.

Referring to FIGS. 33 and 34, SET 0 is an intra mode set including intra modes for a horizontal direction and SET 1 is an intra mode set including intra modes for a vertical direction. When the pixels in the above block are similar to the pixels in the current block and thus the vertical similarity flag has a value of 1, the intra modes of the SET 0 are allocated with shorter codewords BITs or BINs than the intra modes of SET 1. On the other hand, the intra modes of SET 1 may be assigned relatively long codewords compared to the intra modes of SET 0. A lookup table with the above-described features can be constructed.

In the case where the decoded intra modes of the left block of the current block are the horizontal modes, the directionality information of the current block may be determined as being a horizontal direction. In this case, the intra modes included in SET 0 are assigned shorter codewords BIT or BIN than the intra modes included in SET 1. On the other hand, the intra modes of SET 1 may be assigned relatively long codewords compared to the intra modes of SET 0. A lookup table with the above described features can be constructed.

In the case where the decoded intra modes of the upper block of the current block are the vertical modes, the directionality information of the current block may be determined as being a vertical direction. In this case, the intra modes included in SET 1 are assigned shorter codewords BIT or BIN. On the other hand, the intra modes included in SET 0 may be assigned relatively long codewords compared to the intra modes in SET 1. A lookup table with the above-described features can be constructed.

The entropy encoding unit 740 or the entropy decoding unit 1310 may determine a lookup table for intra mode encoding or decoding of the current block, using the directionality information of the neighboring blocks. According to the directionality of the current block which is predicted from neighboring block information, intra modes may be classified into an intra mode set having a relatively short variable-length code assigned to a direction with a higher probability and an intra mode set having a relatively long variable-length code assigned to a direction with a lower probability. Therefore, it is possible to improve entropy coding efficiency through this process.

In addition, the entropy encoding unit 740 or the entropy decoding unit 1310 may perform the arithmetic entropy encoding or decoding assigning a code with a relatively high probability to direction information with a relatively high probability, by using directionality information of the neighboring blocks. In addition, the entropy encoding unit 740 or the entropy decoding unit 1310 may perform arithmetic entropy encoding or decoding assigning a code with a relatively low probability to direction information with a relatively low probability. Therefore, it is possible to improve entropy encoding efficiency through this process.

The above embodiments may be performed in the same method in an encoder and a decoder.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, an additional identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type to which the above embodiments of the present invention are applied may be defined, and the above embodiments may be applied depending on the corresponding slice type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in encoding/decoding an image.

The invention claimed is:

1. An image decoding method comprising:

acquiring, from a bitstream, intra prediction mode information of a current block;

when the current block is non-square, based on a comparison result of an intra prediction mode indicated by the intra prediction mode information and a threshold, shifting a number of the intra prediction mode indicated by the intra prediction mode information by a predetermined offset;

deriving a reference sample of intra prediction of the current block;

generating a prediction block of the current block by performing intra prediction of the current block based on the shifted number of the intra prediction mode and the reference sample;

generating a residual block of the current block from the bitstream; and reconstructing the current block based on the prediction block of the current block and the residual block of the current block, wherein the threshold is determined based on a ratio between a width to a height of the current block.

2. An image encoding method comprising:

determining an intra prediction mode of a current block;

deriving a reference sample of intra prediction of the current block;

generating a prediction block of the current block by performing intra prediction of the current block based on the intra prediction mode and the reference sample;

generating a residual block of the current block based on the prediction block of the current block;

generating transform coefficients of the current block based on the residual block of the current block;

encoding the transform coefficients of the current block;

when the current block is non-square, based on a comparison result of the intra prediction mode of the current block and a threshold, shifting a number of the intra prediction mode of the current block by a predetermined offset; and encoding intra prediction mode information of the current block based on the shifted number of the intra prediction mode of the current block, wherein the threshold is determined based on a width and a height of the current block.

3. A transmission method for data comprising a bitstream for an image, the method comprising:

obtaining the bitstream for the image; and transmitting the data of the bitstream, wherein the bitstream is generated by performing the steps of:

determining an intra prediction mode of a current block;

deriving a reference sample of intra prediction of the current block;

generating a prediction block of the current block by performing intra prediction of the current block based on the intra prediction mode and the reference sample;

generating a residual block of the current block based on the prediction block of the current block;

generating transform coefficients of the current block based on the residual block of the current block;

encoding the transform coefficients of the current block;

when the current block is non-square, based on a comparison result of the intra prediction mode of the current block and a threshold, shifting a number of the intra prediction mode of the current block by a predetermined offset; and encoding intra prediction mode information of the current block based on the shifted number of the intra prediction mode of the current block, wherein the threshold is determined based on a width and a height of the current block.

* * * * *